US012387679B2

(12) United States Patent
Nakakohara

(10) Patent No.: US 12,387,679 B2
(45) Date of Patent: Aug. 12, 2025

(54) LIGHT EMITTING DEVICE

(71) Applicant: ROHM CO., LTD., Kyoto (JP)

(72) Inventor: Yusuke Nakakohara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/633,664

(22) Filed: Apr. 12, 2024

(65) Prior Publication Data

US 2024/0355283 A1 Oct. 24, 2024

(30) Foreign Application Priority Data

Apr. 19, 2023 (JP) ................................ 2023-068588

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/0233* (2013.01)

(58) Field of Classification Search
CPC ......... G09G 3/3233; G09G 2300/0842; G09G 2310/08; G09G 2320/0233; H05B 45/30; H05B 45/40; H05B 45/60
See application file for complete search history.

(56) References Cited

U.S. PATENT DOCUMENTS 11,172,558 B2 * 11/2021 Qiu ........................ H05B 45/40
12,062,303 B2 * 8/2024 Kiamilev ............. H05B 45/397
2009/0078853 A1 * 3/2009 Lin ...................... G09G 3/3426 250/205
2010/0201283 A1 * 8/2010 Kawata ............. H05B 45/3725 315/287
2018/0338364 A1 * 11/2018 Ido ......................... H05B 45/10
2019/0097533 A1 * 3/2019 Kawata .................. H05B 47/25
2023/0099245 A1 3/2023 Takahashi et al.

FOREIGN PATENT DOCUMENTS

WO WO 2021/181733 9/2021

* cited by examiner

*Primary Examiner* — Jeff Piziali
(74) *Attorney, Agent, or Firm* — Fish & Richardson P.C.

(57) ABSTRACT

A light emitting device includes first to L-th light emitting unit circuits, each of which includes a light emitting element configured to emit light by being supplied with a current, and a capacitor configured to accumulate charges for supply to the light emitting element, a charging switching circuit including first to M-th charging switches and configured to switch between supply and non-supply of a charging current to each capacitor, a light emitting switching circuit including first to N-th light emitting switches and configured to switch between supply and non-supply of the accumulated charges of the capacitor to the light emitting element in each of the light emitting unit circuits, and a control circuit configured to control a state of each of the charging switches and a state of each of the light emitting switches.

18 Claims, 21 Drawing Sheets

LIGHT EMITTING DEVICE

CROSS-REFERENCE TO RELATED APPLICATION

This application is based upon and claims the benefit of priority from Japanese Patent Application No. 2023-068588, filed on Apr. 19, 2023, the entire contents of which are incorporated herein by reference.

TECHNICAL FIELD

The present disclosure relates to a light emitting device.

BACKGROUND

In the related art, a light emitting device includes a light emitting element that emits light by being supplied with a current. There is also a light emitting device that includes a plurality of light emitting elements and individually controls the light emission of the plurality of light emitting elements.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
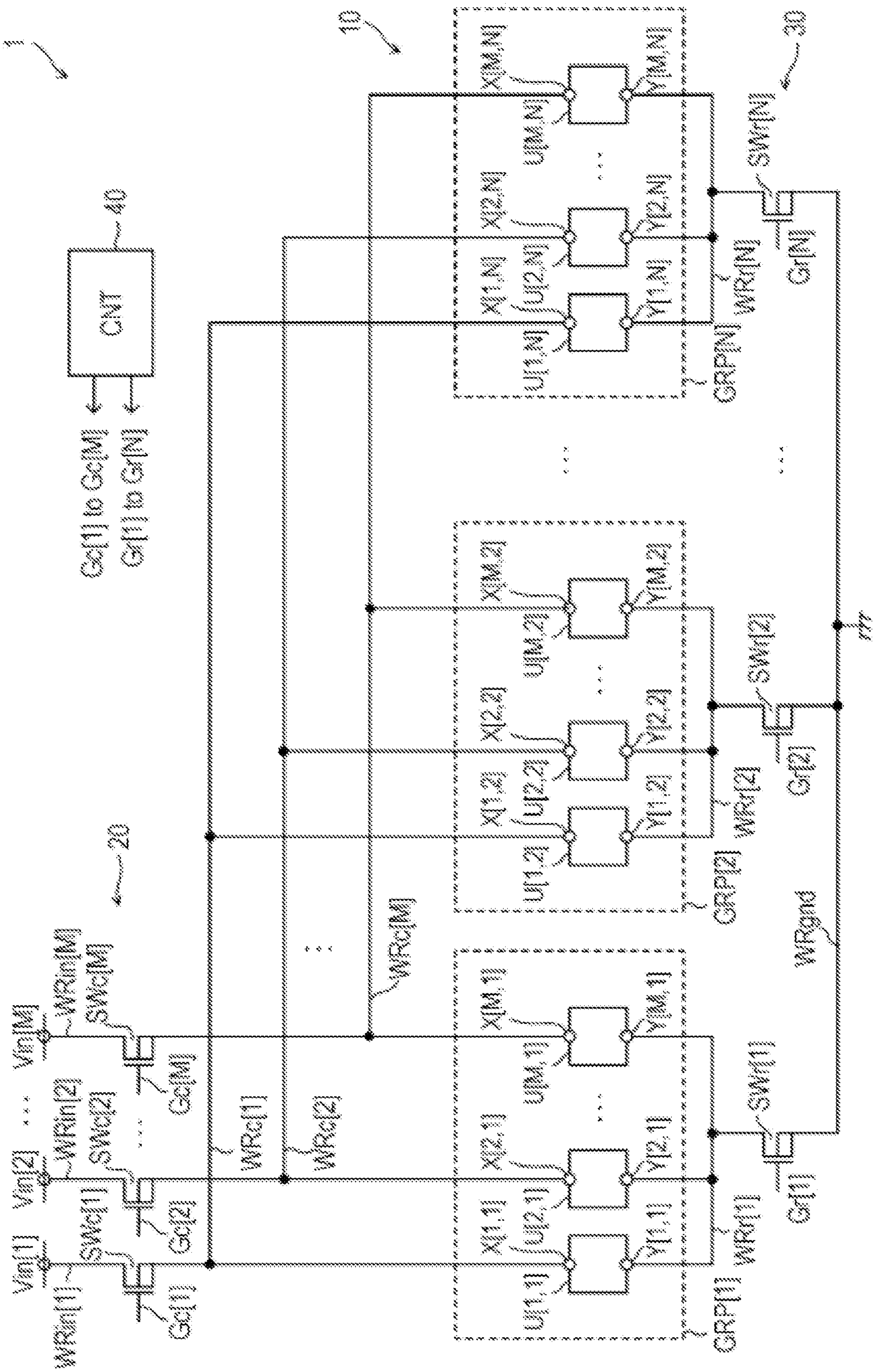
FIG. 1 is an overall configuration diagram of a light emitting device according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and constituent elements have not been described in detail so as not to unnecessarily obscure aspects of the various embodiments.

Examples of embodiments of the present disclosure will be specifically described below with reference to the drawings. Throughout the referred drawings, the same parts are denoted by the same reference numerals, and duplicate explanation thereof will not be repeated in principle. In the present disclosure, for the sake of simplification of description, by describing a symbol or a code that refers to information, a signal, a physical quantity, a functional part, a circuit, an element, a parts, etc., the information, the signal, the physical quantity, the functional part, the circuit, the element, the part, etc., corresponding to the symbol or the code may be omitted or abbreviated. For example, a charging switch referred to by “SWc” (see FIG. 1), which will be described, may be written as a charging switch SWc, or may be abbreviated as a switch SWc, but they all refer to the same thing.

First, some terms used in the description of the embodiments of the present disclosure will be explained. The ground refers to a reference conductive portion having a reference potential of 0 V (zero volts) or refers to the potential of 0 V itself. The reference conductive portion may be formed of a conductor such as metal. The potential of 0 V may be referred to as a ground potential. In the embodiments of the present disclosure, a voltage shown without any particular reference represents the potential seen from the ground. A level refers to the level of potential, with a high level having a higher potential than a low level for any signal or voltage of interest.

For any transistor configured as a FET (Field Effect Transistor), including a MOSFET, an on state refers to a state in which the drain and source of the transistor are electrically connected to each other, and an off state refers to a state in which the drain and source of the transistor are electrically disconnected (cut-off state) from each other. The same also applies to transistors that are not classified as FETs. Unless otherwise specified, a MOSFET is regarded as an enhancement type MOSFET. MOSFET is an abbreviation for "metal-oxide-semiconductor field-effect transistor." Further, it may be considered that the back gate is short-circuited to the source in any MOSFET unless otherwise specified.

Any switch can include one or more FETs (Field Effect Transistors). When a switch is in an on state, both ends of the switch are electrically connected to each other, while when the switch is in an off state, both ends of the switch are electrically disconnected from each other. Hereinafter, the on state and the off state of any transistor or switch may be simply expressed as on and off, respectively.

Further, for any transistor or switch, a period during which the transistor or switch is in an on state is referred to as an on period, and a period during which the transistor or switch is in an off state is referred to as an off period. For any signal having a signal level of high level or low level, a period during which the level of the signal is a high level is referred to as a high level period, and a period during which the level of the signal is a low level is referred to as a low level period. The same also applies to any voltage that takes a voltage level of high level or low level.

A connection between a plurality of parts forming a circuit, such as arbitrary circuit elements, wirings (lines), and nodes, may be understood to refer to an electrical connection, unless otherwise specified. If any two voltages to be compared are voltages v1 and v2, "v1>v2" means that the voltage v1 is higher than the voltage v2, and "v1<v2" means that the voltage v1 is lower than the voltage v2. The same also applies to other equations that include physical quantities other than a voltage.

FIG. 1 shows an overall configuration of a light emitting device 1 according to an embodiment of the present disclosure. The light emitting device 1 includes a light emitting block 10, a charging switching circuit 20, a light emitting switching circuit 30, and a control circuit 40.

The light emitting block 10 includes a total of L light emitting unit circuits U. The charging switching circuit 20 includes M charging switches SWc. The light emitting switching circuit 30 includes N light emitting switches SWr. Each of M and N represents an arbitrary integer of 2 or more. M and N may be the same or different.

Figure 2:
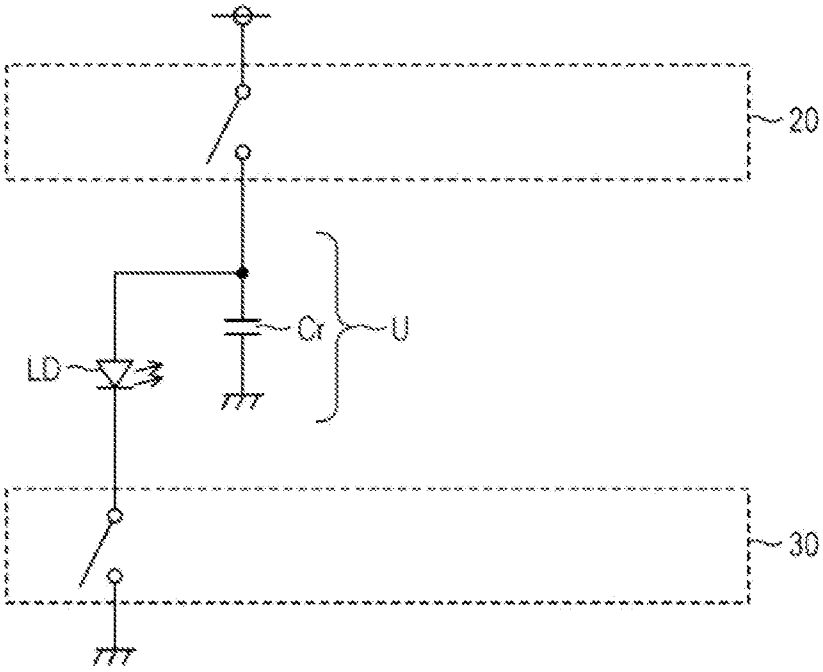
FIG. 2 is a diagram showing constituent elements of one light emitting unit circuit and a relationship between one light emitting unit circuit and peripheral circuits according to the embodiment of the present disclosure.

FIG. 2 shows constituent elements of one light emitting unit circuit U and schematically shows a relationship between one light emitting unit circuit U and the charging switching circuit 20 or the light emitting switching circuit 30. The light emitting unit circuit U includes a capacitor Cr and a light emitting element LD. Although the light emitting unit circuit U may include circuit elements other than the capacitor Cr and the light emitting element LD, only the capacitor Cr and the light emitting element LD among the constituent elements of the light emitting unit circuit U are shown in FIG. 2. In principle, the total of L light emitting unit circuits U includes the same configuration, and hereinafter, unless otherwise specified, it is assumed that the total of L light emitting unit circuits U includes the same configuration.

The light emitting element LD is any light emitting element that emits light by being supplied with a current, and here is a laser diode. The capacitor Cr accumulates charges for supply to the light emitting element LD. The charges for supply to the light emitting element LD refer to charges accumulated in the capacitor Cr in order to be supplied to the light emitting element LD. The light emitting element LD emits light by the accumulated charges of the capacitor Cr being supplied to the light emitting element LD (that is, by a discharging current of the capacitor Cr due to the accumulated charges of the capacitor Cr being supplied to the light emitting element LD).

The charging switching circuit 20 switches between supply and non-supply of the charging current to the capacitor Cr for each of the L light emitting unit circuits U under the control of the control circuit 40. In a certain light emitting unit circuit U, the charging current is supplied to the capacitor Cr, so that the charges for causing the light emitting element LD to emit light are accumulated in the capacitor Cr. Under the control of the control circuit 40, the light emitting switching circuit 30 switches between supply and non-supply of the accumulated charges of the capacitor Cr to the light emitting element LD for each of the L light emitting unit circuits U.

The M charging switches SWc are referred to by symbols SWc[1] to SWc[M]. Hereinafter, any one of the charging switches SWc[1] to SWc[M] may be expressed as a charging switch SWc[i] where i represents any natural number. When i is used to refer to the total of M circuit elements (for example, the charging switches SWc), i is understood to represent a natural number of M or less.

Each of the charging switches SWc[1] to SWc[M] is associated with two or more light emitting unit circuits U among the L light emitting unit circuits U. If p and q are arbitrary natural numbers that are different from each other and satisfy "p≤M" and "q≤N," for each of combinations of p and q, two or more light emitting unit circuits U associated with a charging switch SWc[p] are different from two or more light emitting unit circuits U associated with a charging switch SWc[q]. Each of the charging switches SWc[1] to SWc[M] switches between supply and non-supply of the charging current to the capacitor Cr of two or more light emitting unit circuits U associated with the charging switch SWc[1] to SWc[M].

The N light emitting switches SWr are referred to by symbols SWr[1] to SWr[N]. In the following, any one of the light emitting switches SWr[1] to SWr[N] may be expressed as a light emitting switch SWr[j] where j represents any natural number. When j is used to refer to the total of N circuit elements (for example, the light emitting switches SWr), j is understood to represent a natural number of N or less.

Each of the light emitting switches SWr[1] to SWr[N] is associated with a plurality of light emitting unit circuits U among the L light emitting unit circuits U. If p and q are arbitrary natural numbers that are different from each other and satisfy "p≤M" and "q≤N," for each of combinations of p and q, a plurality of light emitting unit circuits U associated with a light emitting switch SWr[p] are different from a plurality of light emitting unit circuits U associated with a light emitting switch SWr[q]. Each of the light emitting switches SWr[1] to SWr[N] switches between supply and non-supply of the accumulated charges of the capacitor Cr to the light emitting element LD for a plurality of light emitting unit circuits U associated with the light emitting switches SWr[1] to SWr[N].

Each of the switches SWc and SWr can be configured with any type of switching element. In this embodiment, it is assumed that each of the switches SWc and SWr is configured with an N-channel MOSFET. Therefore, each of the switches SWc and SWr includes a drain, a source, and a gate.

The drain of each charging switch SWc is connected to an input wiring WRin. The input wiring WRin to which the drain of the charging switch SWc[i] is connected is referred to as an input wiring WRin[i]. Therefore, the drains of the charging switches SWc[1] to SWc[M] are connected to input wirings WRin[1] to WRin[M], respectively. Input voltages Vin[1] to Vin[M] are applied to the input wirings WRin[1] to WRin[M], respectively. That is, the input voltage Vin[1] is applied to the input wiring WRin[1], and the input voltage Vin[2] is applied to the input wiring WRin[2]. The same applies to the input wiring WRin[3] and the like. The input voltages Vin[1] to Vin[M] have positive DC voltage values.

The input wirings WRin[1] to WRin[M] may be a common input wiring (that is, a single input wiring). In this case, the input voltages Vin[1] to Vin[M] are a common input voltage (that is, a single input voltage), and the common input voltage is applied to each of the drains of the charging switches SWc[1] to SWc[M].

The input voltages Vin[1] to Vin[M] may be M types of input voltages that are different from each other. In this case, the input wirings WRin[1] to WRin[M] are M wirings that are separated from each other. The input voltages Vin[1] to Vin[M] may include less than M types of DC voltages. For example, when "M=4," the input voltages Vin[1] and Vin[2] may be a first DC voltage, and the input voltages Vin[3] and Vin[4] may be a second DC voltage. At this time, the first and second DC voltages are output from two voltage sources.

The source of each charging switch SWc is connected to a charging wiring WRc. The charging wiring WRc to which the source of the charging switch SWc[i] is connected is referred to as a charging wiring WRc[i]. Therefore, the sources of the charging switches SWc[1] to SWc[M] are connected to charging wirings WRc[1] to WRc[M], respectively.

The drain of each light emitting switch SWr is connected to a light emitting wiring WRr. The light emitting wiring WRr to which the drain of the light emitting switch SWr[j] is connected is referred to as a light emitting wiring WRr[j]. Therefore, the drains of the light emitting switches SWr[1] to SWr[N] are connected to light emitting wirings WRr[1] to WRr[N], respectively. Each of the sources of the light emitting switches SWr[1] to SWr[N] is connected to a ground wiring WRgnd (reference wiring). The ground wiring WRgnd has a ground potential (reference potential).

Each of the L light emitting unit circuits U in the light emitting block 10 belongs to one of N light emitting groups GRP. The N light emitting groups GRP are referred to by symbols GRP[1] to GRP[N]. The light emitting groups GRP[1] to GRP[N] correspond to the light emitting switches SWr[1] to SWr[N], respectively.

Each light emitting group GRP includes two or more light emitting unit circuits U. In this embodiment, unless otherwise specified, it is assumed that each light emitting group GRP includes M light emitting unit circuits U. Then, the total number of light emitting unit circuits U is (M×N). That is, "L=M×N" holds true. Here, since M and N represent integers of 2 or more, L represents an integer of 4 or more. However, a light emitting group GRP including less than M light emitting unit circuits U may be included in the light emitting groups GRP[1] to GRP[N], in which case, "L<M×N." However, in any case, it is preferable that "L>M+N" holds true.

The M light emitting unit circuits U provided in the light emitting group GRP[1] are referred to by symbols U[1,1] to U[M,1]. Similarly, the M light emitting unit circuits U provided in the light emitting group GRP[2] are referred to by symbols U[1,2] to U[M,2]. The same applies to other light emitting groups GRP. Generalizing by using a natural number j, the M light emitting unit circuits U provided in the light emitting group GRP[j] are referred to by symbols U[1,j] to U[M,j]. A light emitting unit circuit U[i,j] is an i-th light emitting unit circuit U in the light emitting group GRP[j]. The i-th light emitting unit circuit U in each light emitting group GRP is associated with the charging switch SWc[i] (that is, the light emitting unit circuit U[i, 1] to the light emitting unit circuit U[i,N] are associated with the charging switch SWc[i]).

Each light emitting unit circuit U includes an input node X and an output node Y. The input node X in the light emitting unit circuit U[i,j] is referred to by symbol X[i,j], and the output node Y in the light emitting unit circuit U[i,j] is referred to by symbol Y[i,j].

The charging wiring WRc[1] is connected to the total of N input nodes X[1,1] to X[1,N] and therefore is connected to the total of N light emitting unit circuits U[1,1] to U[1, N]. Similarly, the charging wiring WRc[2] is connected to the total of N input nodes X[2,1] to X[2,N] and therefore is connected to the total of N light emitting unit circuits U[2,1] to U[2,N]. The same applies to the charging wiring WRc[3] and the like. Generalizing by using a natural number i, the charging wiring WRc[i] is connected to the total of N input nodes X[i, 1] to X[i,N] and therefore is connected to the total of N light emitting unit circuits U[i, 1] to U[i,N]. The i-th light emitting unit circuit U in each light emitting group GRP is connected to the charging wiring WRc[i].

When the charging switch SWc[i] is on, a charging operation in which a charging current based on the input voltage Vin[i] is supplied to the capacitor Cr of the i-th light emitting unit circuit U in each light emitting group GRP through the charging switch SWc[i] and the charging wiring WRc[i] is performed. When the charging switch SWc[i] is off, the charging operation is not performed.

The light emitting wiring WRr[1] is connected to the total of M output nodes Y[1,1] to Y[M,1] and therefore is connected to the total of M light emitting unit circuits U[1,1] to U[M, 1]. Similarly, the light emitting wiring WRr[2] is connected to the total of M output nodes Y[1,2] to Y[M,2] and therefore is connected to the total of M light emitting unit circuits U[1,2] to U[M,2]. The same applies to the light emitting wiring WRr[3] and the like. Generalizing by using a natural number j, the light emitting wiring WRr[j] is connected to the total of M output nodes Y[1,j] to Y[M.j] and therefore is connected to the total of M light emitting unit circuits U[1,j] to U[M,j]. All the light emitting unit circuits U in the light emitting group GRP[j] are connected to the light emitting wiring WRr[j] and therefore are associated with the light emitting switch SWr[j].

In each light emitting unit circuit U belonging to the light emitting group GRP[j], the discharging current due to the accumulated charges in the capacitor Cr flows through the corresponding light emitting element LD, light emitting wiring WRr[j], and light emitting switch SWr[j] only when the light emitting switch SWr[j] is on.

The control circuit 40 individually controls the states of the charging switches SWc[1] to SWc[M] and the light emitting switches SWr[1] to SWr[N]. The control circuit 40 supplies gate signals Gc[1] to Gc[M] to the gates of the charging switches SWc[1] to SWc[M], respectively. The control circuit 40 supplies gate signals Gr[1] to Gr[N] to the gates of the light emitting switches SWr[1] to SWr[N], respectively. Each gate signal has a high level or a low level. The control circuit 40 includes a gate drive circuit (which may be considered as M gate drive circuits) that supplies the gate signals Gc[1] to Gc[M] to the charging switches SWc [1] to SWc[M], and a gate drive circuit (which may be considered as N gate drive circuits) that supplies the signals Gr[1] to Gr[N] to the light emitting switches SWr[1] to SWr[N].

The charging switch SWc[i] is in an on state during the high level period of the gate signal Gc[i], and the charging switch SWc[i] is in an off state during the low level period of the gate signal Gc[i]. The light emitting switch SWr[j] is in an on state during the high level period of the gate signal Gr[j], and the light emitting switch SWr[j] is in an off state during the low level period of the gate signal Gr[j]. However, the low level of the gate signal Gc[i] has the same potential as the potential of the charging wiring WRc[i], and the high level of the gate signal Gc[i] is higher by a first predetermined voltage than the potential of the charging wiring WRc[i]. The first predetermined voltage is higher than the gate threshold voltage of the charging switch SWc[i]. The low level of the gate signal Gr[j] has the ground potential, and the high level of the gate signal Gr[j] is higher by a second predetermined voltage than the ground potential. The second predetermined voltage is higher than the gate threshold voltage of the light emitting switch SWr[j].

A module may be formed in which all the light emitting elements LD belonging to one light emitting group GRP are grouped together. In this case, first to N-th modules corresponding to the light emitting groups GRP[1] to GRP[N] are formed. An i-th module is an integrated component that collectively includes the light emitting elements LD in the light emitting unit circuits U[i, 1] to U[i,M]. A j-th module may include only M light emitting elements LD, or may include all M light emitting unit circuits U[1,j] to U[M.j]. A plurality of light emitting elements LD in the light emitting device 1 may be installed as separate discrete components without forming a module.

Hereinafter, among a plurality of Examples, specific configuration examples, operation examples, application techniques, modification techniques, etc. related to the light emitting device 1 will be described. The matters described above in the present embodiment are applied to each of the following Examples unless otherwise stated and unless contradictory. In each Example, if there are matters that contradict the above-described matters, the description in each Example may take precedence. In addition, as long as there is no contradiction, the matters described in any of the following Examples can be applied to any other Examples (that is, it is also possible to combine any two or more of the Examples).

First Example

Figure 3:
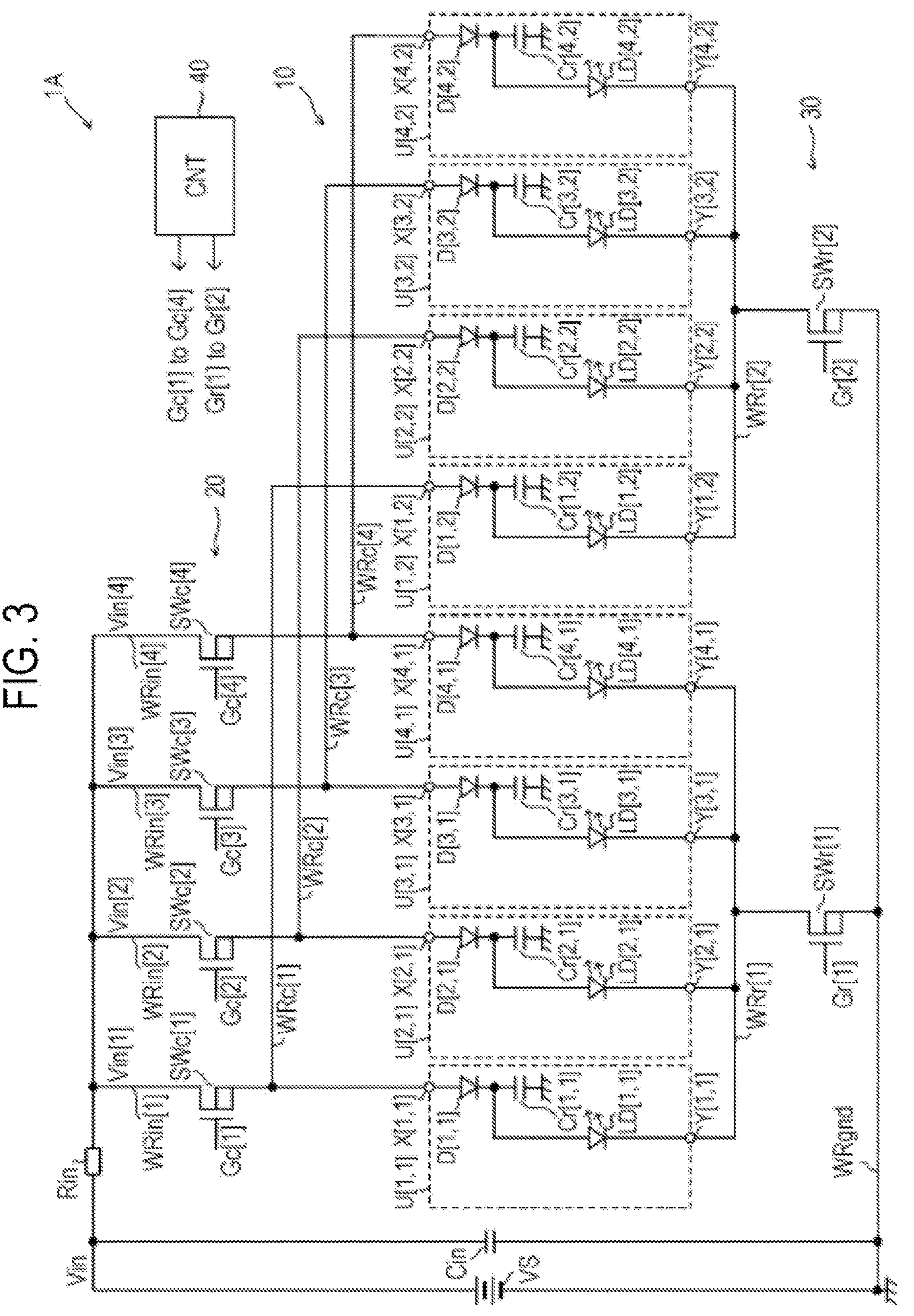
FIG. 3 is a configuration diagram of a light emitting device according to a first Example belonging to the embodiment of the present disclosure.

A first Example will be described. FIG. 3 shows a configuration of a light emitting device 1A which is the light emitting device 1 according to the first Example. In the first Example, "M=4," "N=2," and "L=8." Further, in the first Example, the common input wiring (that is, the single input wiring) functions as the input wirings WRin[1] to WRin[4], and therefore the input voltages Vin[1] to Vin[4] are the common input voltage Vin (that is, the single input voltage), and the common input voltage Vin is applied to each of the drains of the charging switches SWc[1] to SWc[4]. The light emitting device 1A is provided with eight light emitting unit circuits U, including the light emitting unit circuits U[1,1] to U[4,1] and U[1,2] to U[4,2]. The four light emitting unit circuits U[1,1] to U[4,1] belong to the light emitting group GRP[1], and the four light emitting unit circuits U[1,2] to U[4,2] belong to the light emitting group GRP[2] (see also FIG. 1).

A voltage source VS is provided in the light emitting device 1A or externally connected to the light emitting device 1A. The voltage source VS includes a negative output terminal and a positive output terminal. The voltage source VS outputs a positive DC voltage Vin from the positive output terminal on the basis of the potential of the negative output terminal. The negative output terminal of the voltage source VS is connected to the ground wiring WRgnd having the ground potential. Further, an input capacitor Cin is connected between the negative output terminal and the positive output terminal of the voltage source VS. The positive output terminal of the voltage source VS is connected to the above-mentioned common input wiring via an input resistor Rin (therefore is connected to the input wirings WRin[1] to WRin[4]). The input resistor Rin limits a current flowing through the charging switch SWc[i] so that the current does not become excessive during an on period of the charging switch SWc[i]. A voltage drop caused by the input resistor Rin is ignored as it is sufficiently small. Then, all the input voltages Vin[1] to Vin[4] match the DC voltage Vin which is the common input voltage Vin. In the light emitting device 1A, an inductor Lin (not shown) for limiting a transient current may be provided instead of the input resistor Rin, or a series circuit of an input resistor Rin and an inductor Lin may be provided instead of the input resistor Rin (the same applies to any other light emitting device to be described later in which an input resistor is provided).

The sources of the charging switches SWc[1] to SWc[4] are connected to the charging wirings WRc[1] to WRc[4], respectively.

By connecting the charging wiring WRc[1] to the input nodes X[1,1] and X[1,2], the charging switch SWc[1] is associated with the light emitting unit circuits U[1,1] and U[1,2].

By connecting the charging wiring WRc[2] to the input nodes X[2,1] and X[2,2], the charging switch SWc[2] is associated with the light emitting unit circuits U[2,1] and U[2,2].

By connecting the charging wiring WRc[3] to the input nodes X[3,1] and X[3,2], the charging switch SWc[3] is associated with the light emitting unit circuits U[3,1] and U[3,2].

By connecting the charging wiring WRc[4] to the input nodes X[4,1] and X[4,2], the charging switch SWc[4] is associated with the light emitting unit circuits U[4,1] and U[4,2].

The drains of the light emitting switches SWr[1] and SWr[2] are connected to the light emitting wirings WRr[1] and WRr[2], respectively. Each of the sources of the light emitting switches SWr[1] and SWr[2] is connected to the ground wiring WRgnd.

By connecting the light emitting wiring WRr[1] to the output nodes Y[1,1], Y[2,1], Y[3,1], and Y[4,1], the light emitting switch SWr[1] is associated with the light emitting unit circuits U[1,1], U[2,1], U[3, 1], and U[4,1].

By connecting the light emitting wiring WRr[2] to the output nodes Y[1,2], Y[2,2], Y[3,2], and Y[4,2], the light emitting switch SWr[2] is associated with the light emitting unit circuits U[1,2], U[2,2], U[3,2], and U[4,2].

Each light emitting unit circuit U includes a light emitting element LD, a capacitor Cr, and a charging diode D. The light emitting element LD, the capacitor Cr, and the charging diode D in the light emitting unit circuit U[i,j] are referred to as a light emitting element LD[i,j], a capacitor Cr[i], and a charging diode D[i,j], respectively. Since the eight light emitting unit circuits U provided in the light emitting device 1A include the same configuration, the configuration of the light emitting unit circuit U[i,j] will be described as a representative among the eight light emitting unit circuits U.

The charging diode D[i,j] is connected in series to the capacitor Cr[i,j] and has a forward direction from the charging switching circuit 20 toward the capacitor Cr[i,j]. Specifically, in the light emitting unit circuit U[i,j], the anode of the charging diode D[i,j] is connected to the input node X[i,j], and the cathode of the charging diode D[i,j] is connected to the first end of the capacitor Cr[i]. The second end of the capacitor Cr[i,j] is connected to the ground (in other words, connected to the ground wiring WRgnd). The first end of the capacitor Cr[i,j] is connected to the first end of the light emitting element LD[i,j], and the second end of the light emitting element LD[i,j] is connected to the output node Y[i,j]. The first end and the second end of the light emitting element LD[i,j] correspond to the anode and the cathode of the light emitting element LD[i,j], respectively. As a current flows from the first end to the second end of the light emitting element LD[i,j], the light emitting element LD[i,j] emits light.

As a charging current is supplied to the capacitor Cr[i,j] through the charging switching circuit 20, charges are accumulated in the capacitor Cr[i,j], and when seen from the second end of the capacitor Cr[i,j], the potential of the first end of the capacitor Cr[i,j] increases by an amount corresponding to the accumulated charges. Thereafter, when the corresponding light emitting switch SWr[j] is turned on, a discharging current due to the accumulated charges of the capacitor Cr[i,j] flows through the light emitting element LD[i,j] and the light emitting switch SWr[j], whereby the light emitting element LD[i,j] emits light. By providing the capacitor Cr[i,j], it is possible to reduce the inductance component of an electric path of a current supplied to the light emitting element LD[i,j]. In the following description, when the eight light emitting elements LD are simply referred to, it refers to the light emitting elements LD[1,1] to LD[4,1] and LD[1,2] to LD[4,2].

Figure 4:
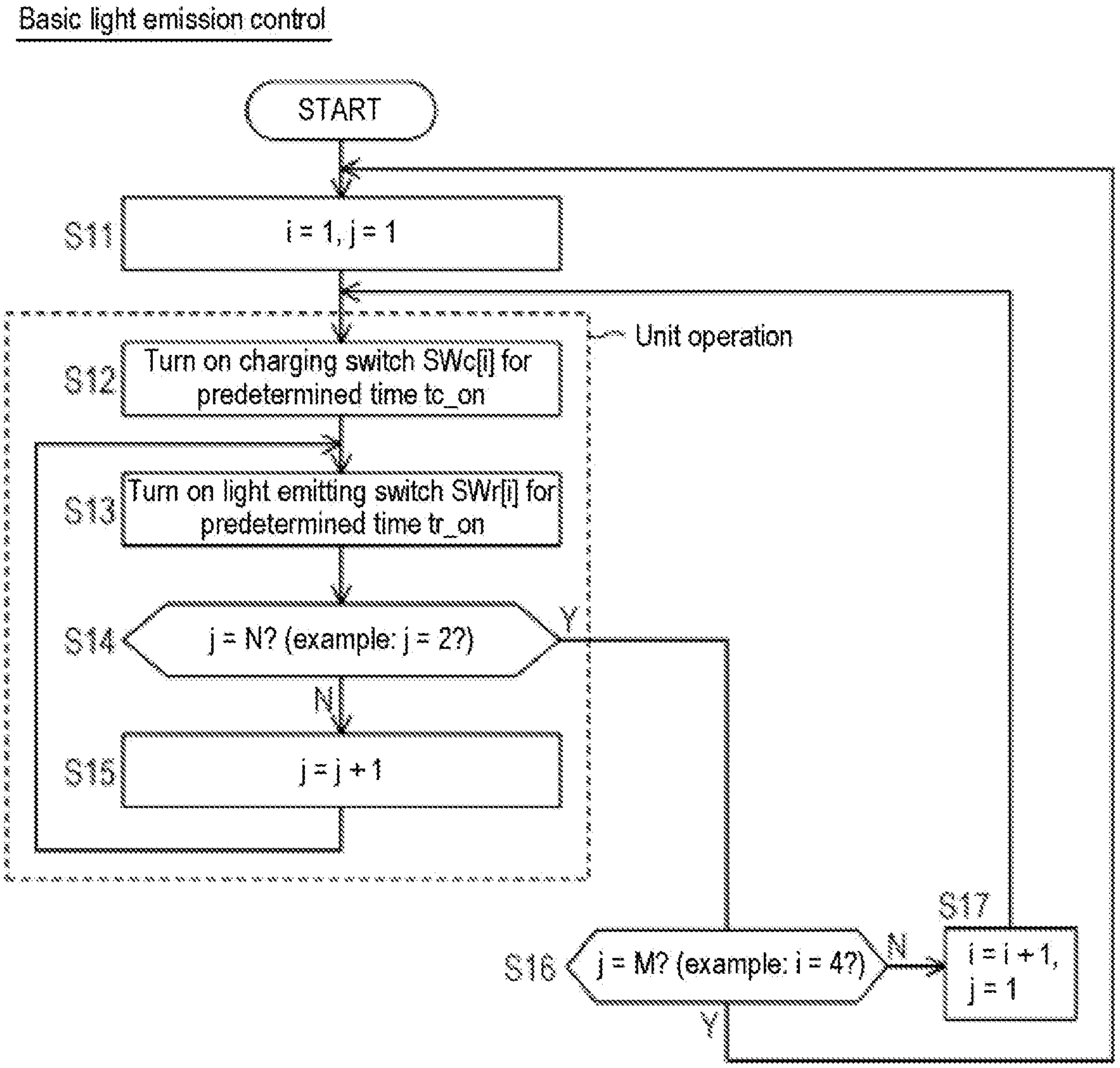
FIG. 4 is a flowchart of basic light emission control according to the first Example belonging to the embodiment of the present disclosure.

FIG. 4 is a flowchart of basic light emission control that can be executed by the control circuit 40 in the light emitting device 1A. The basic light emission control will be described with reference to FIG. 4. Note that the basic light emission control shown in FIG. 4 is not limited to a case where "(M, N)=(4, 2)," but can be widely applied to any integer M of 2 or more and any integer N of 2 or more.

In the basic light emission control, first, in step S11, 1 is assigned to each of variables i and j managed by the control circuit 40. After step S11, the control proceeds to step S12. In step S12, the control circuit 40 controls only the charging switch SWc[i] among the charging switches SWc[1] to SWc[M] to be turned on for a predetermined time tc_on. In step S12, charging switches SWc other than the charging switch SWc[i] are maintained off. In step S12, a charging current based on the input voltage Vin[i] is supplied through the charging switch SWc[i] to the capacitors Cr[i, 1] to Cr[i,N] of each light emitting unit circuit U corresponding to the charging switch SWc[i], thereby charging the capacitors Cr[i, 1] to Cr[i,N]. In step S12, it is preferable to set tc_on for a predetermined time so that a voltage between both terminals of the capacitors Cr[i, 1] to Cr[i,N] substantially increases up to the input voltage Vin[i] (here ignoring the forward voltage of the charging diode D). In the following, unless otherwise specified, it is assumed that in step S12, the voltage between both terminals of the capacitors Cr[i, 1] to Cr[i,N] increases up to the input voltage Vin[i].

Figure 5:
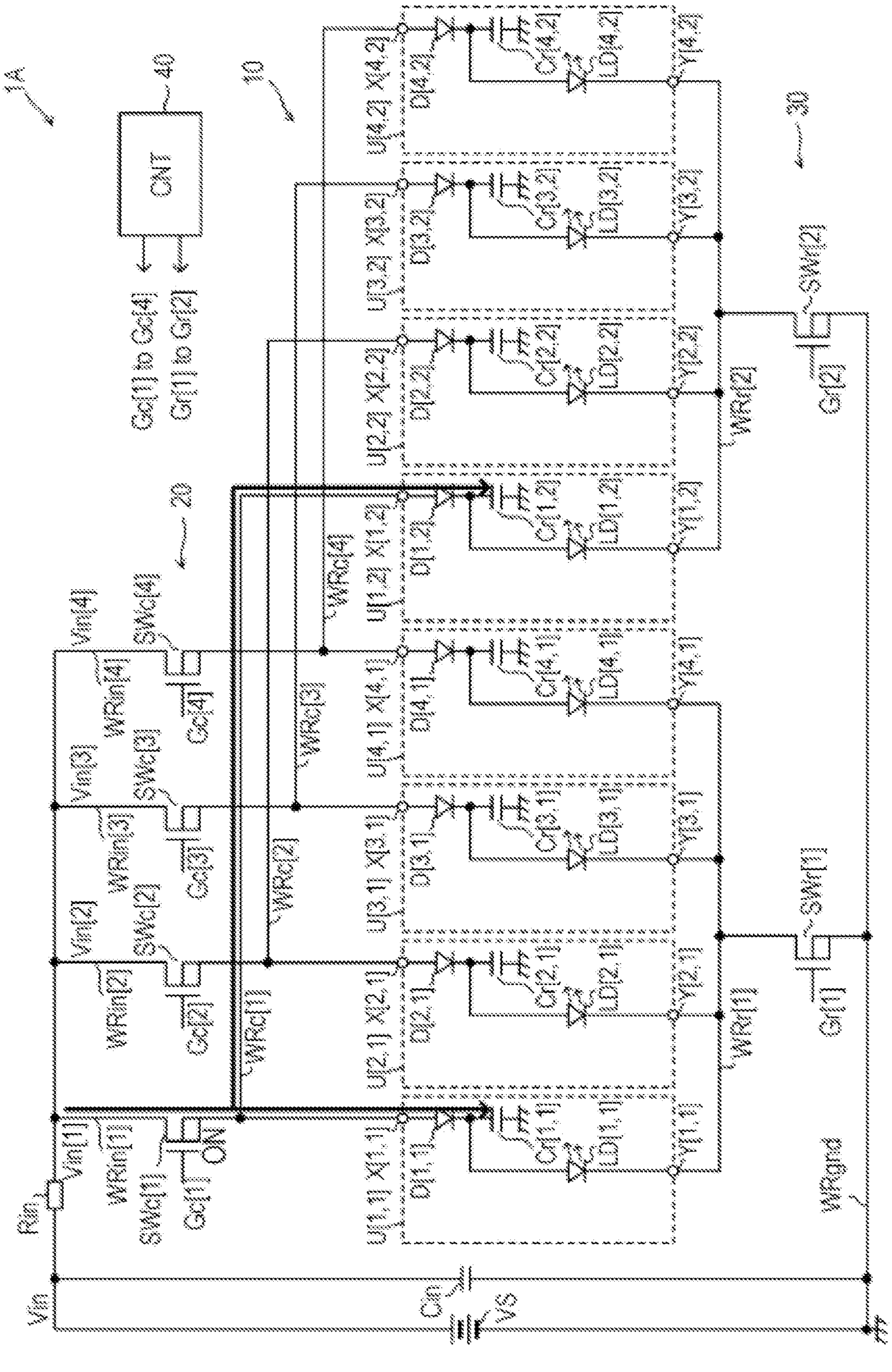
FIG. 5 is a diagram showing a flow of a charging current during an on period of one charging switch, according to the first Example belonging to the embodiment of the present disclosure.

FIG. 5 shows a state of the light emitting device 1A when the charging switch SWc[1] is turned on in step S12 with "i=1." When the charging switch SWc[1] is turned on in step S12 with "i=1," a charging current based on the input voltage Vin[1] is supplied through the charging switch SWc[1] to the capacitors Cr[1, 1] and Cr[1,2], thereby charging the capacitors Cr[1,1] and Cr[1,2].

After the charging switch SWc[i] is turned on for a predetermined time tc_on in step S12, when the charging switch SWc[i] is turned off, the control proceeds to step S13.

In step S13, the control circuit 40 controls only the light emitting switch SWr[j] among the light emitting switches SWr[1] to SWr[N] to be turned on for a predetermined time tr_on. In step S13, light emitting switches SWr other than the light emitting switch SWr[j] are maintained off. After the light emitting switch SWr[j] is turned on for the predetermined time tr_on, when the light emitting switch SWr[j] is turned off, the control proceeds to step S14. In step S14, the control circuit 40 determines whether or not "j=N" (in the light emitting device 1A, determines whether or not "j=2"). When "j=N" holds true, the control proceeds from step S14 to step S16, and when "j=N" does not hold true, the control proceeds from step S14 to step S15. In step S15, the control circuit 40 adds 1 to the variable j, and then the control returns to step S13.

Figure 6:
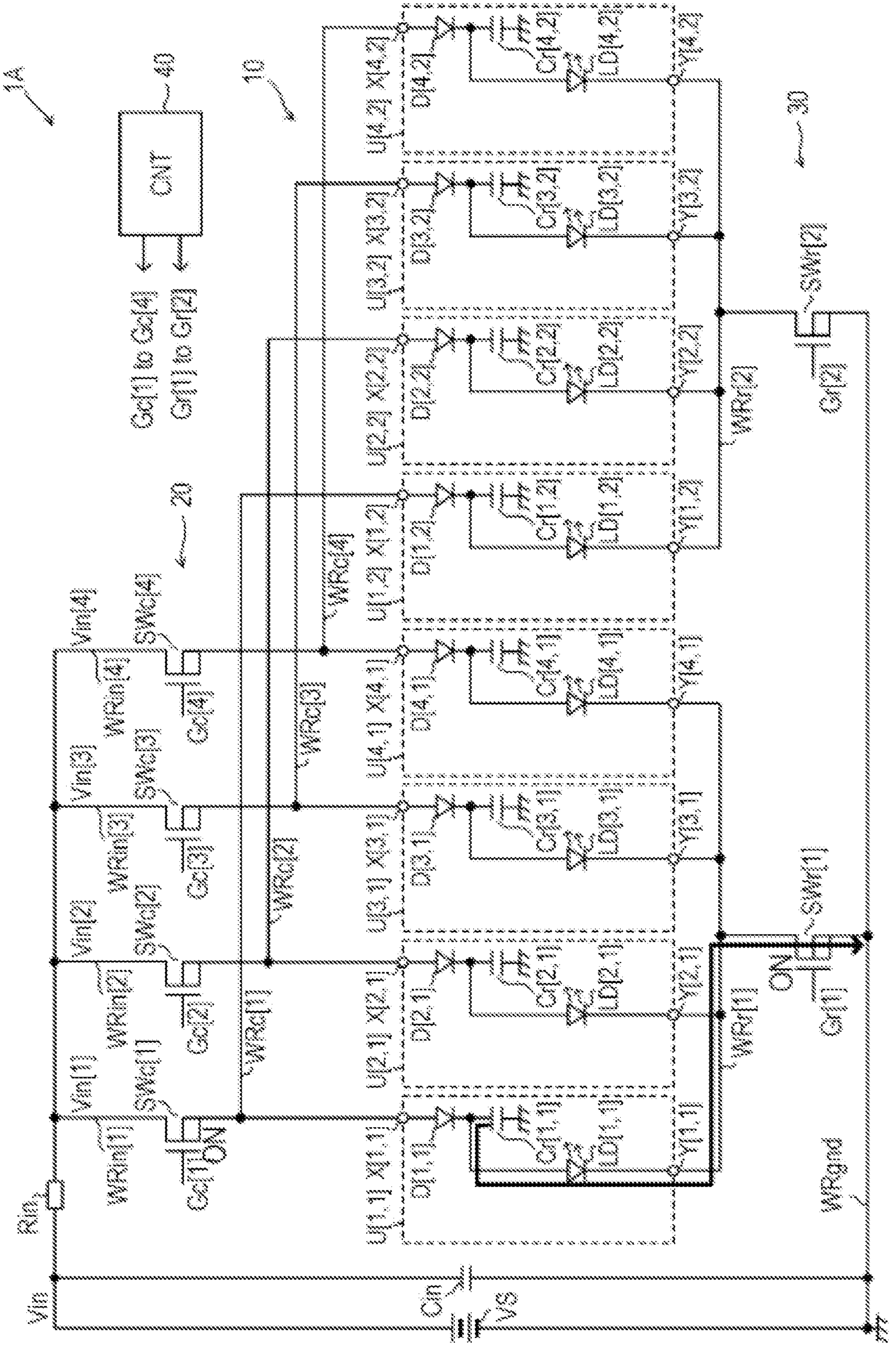
FIG. 6 is a diagram showing a flow of a discharging current during an on period of one light emitting switch according to the first Example belonging to the embodiment of the present disclosure.

FIG. 6 shows a state of the light emitting device 1A in a period in which the light emitting switch SWr[1] is turned on in step S13 with "(i,j)=(1,1)." In the period of FIG. 6, as a discharging current due to the accumulated charges of the capacitor Cr[1,1] flows to the ground through the light emitting element LD[1,1] and the light emitting switch SWr[1], the light emitting element LD[1,1] emits light.

Figure 7:
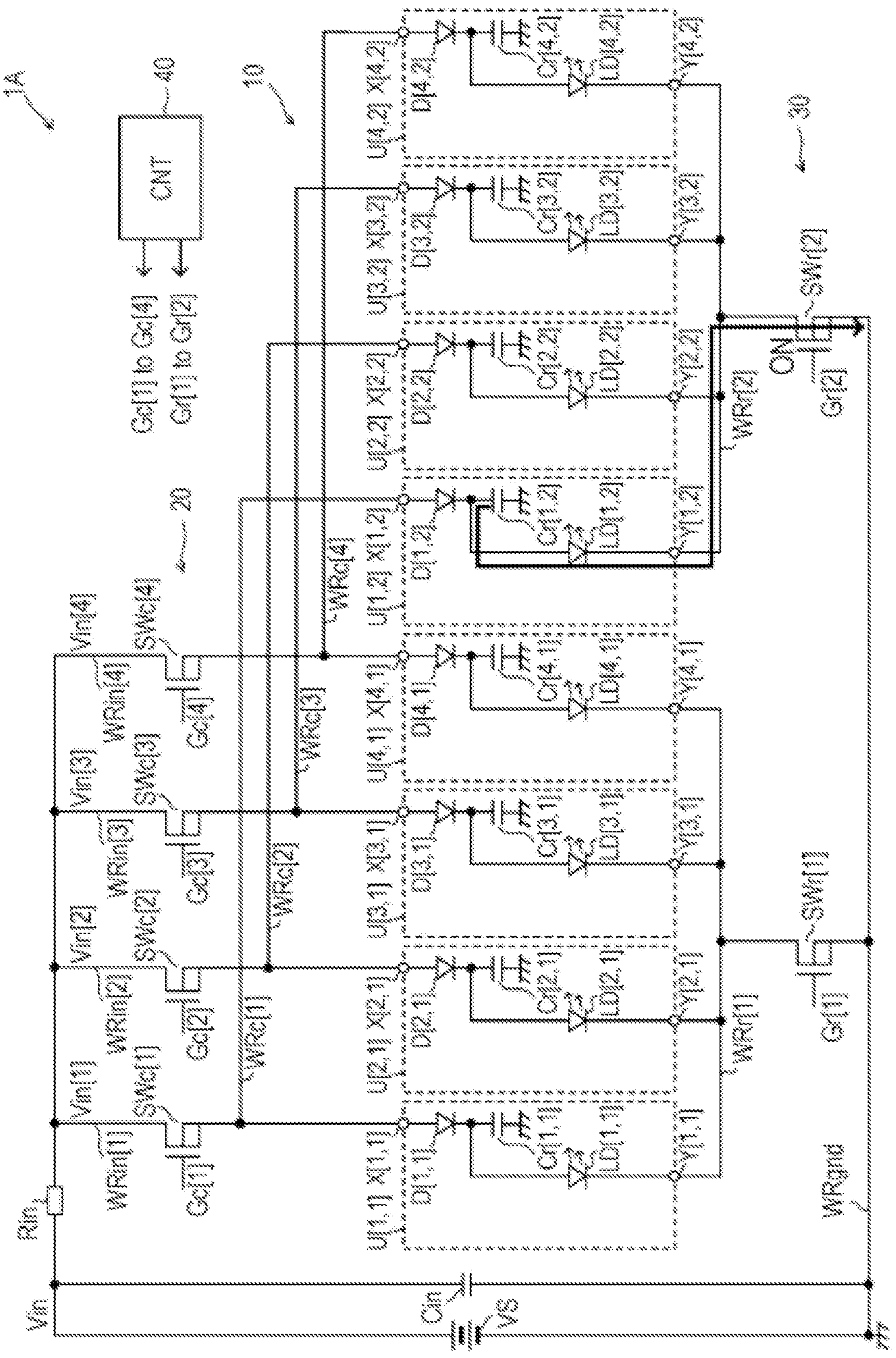
FIG. 7 is a diagram showing a flow of a discharging current during an on period of another light emitting switch according to the first Example belonging to the embodiment of the present disclosure.

FIG. 7 shows a state of the light emitting device 1A in a period in which the light emitting switch SWr[2] is turned on in step S13 with "(i,j)=(1,2)." In the period of FIG. 7, as a discharging current due to the accumulated charges of the capacitor Cr[1,2] flows to the ground through the light emitting element LD[1,2] and the light emitting switch SWr[2], the light emitting element LD[1,2] emits light.

The predetermined time tr_on may be set so that almost all of the accumulated charges of the capacitor Cr[1,1] are discharged during the on period of the light emitting switch SWr[1] corresponding to the period of FIG. 6 and almost all of the accumulated charges of the capacitor Cr[1,2] are discharged during the on period of the light emitting switch SWr[2] corresponding to the period of FIG. 7.

In step S16, the control circuit 40 determines whether or not "i=M" (in the light emitting device 1A, determines whether or not "i=4"). When "i=M" holds true, the control returns from step S16 to step S11. At this time, the timing of returning from step S16 to step S11 may be controlled so that the reciprocal of a difference between the previous processing time of step S11 and the current processing time of step S11 has a constant frequency. When "i=M" does not hold true in step S16, the control proceeds from step S16 to step S17. In step S17, the control circuit 40 adds 1 to the variable i and assigns 1 to the variable j. After that, the control returns to step S12.

A unit operation is formed by the processing of steps S12 to S15. The unit operation when "i=1" is referred to as a first unit operation, and the unit operation when "i=2" is referred to as a second unit operation. The same applies when "i>3." Then, the basic light emission control includes first to M-th unit operations.

Figure 8:
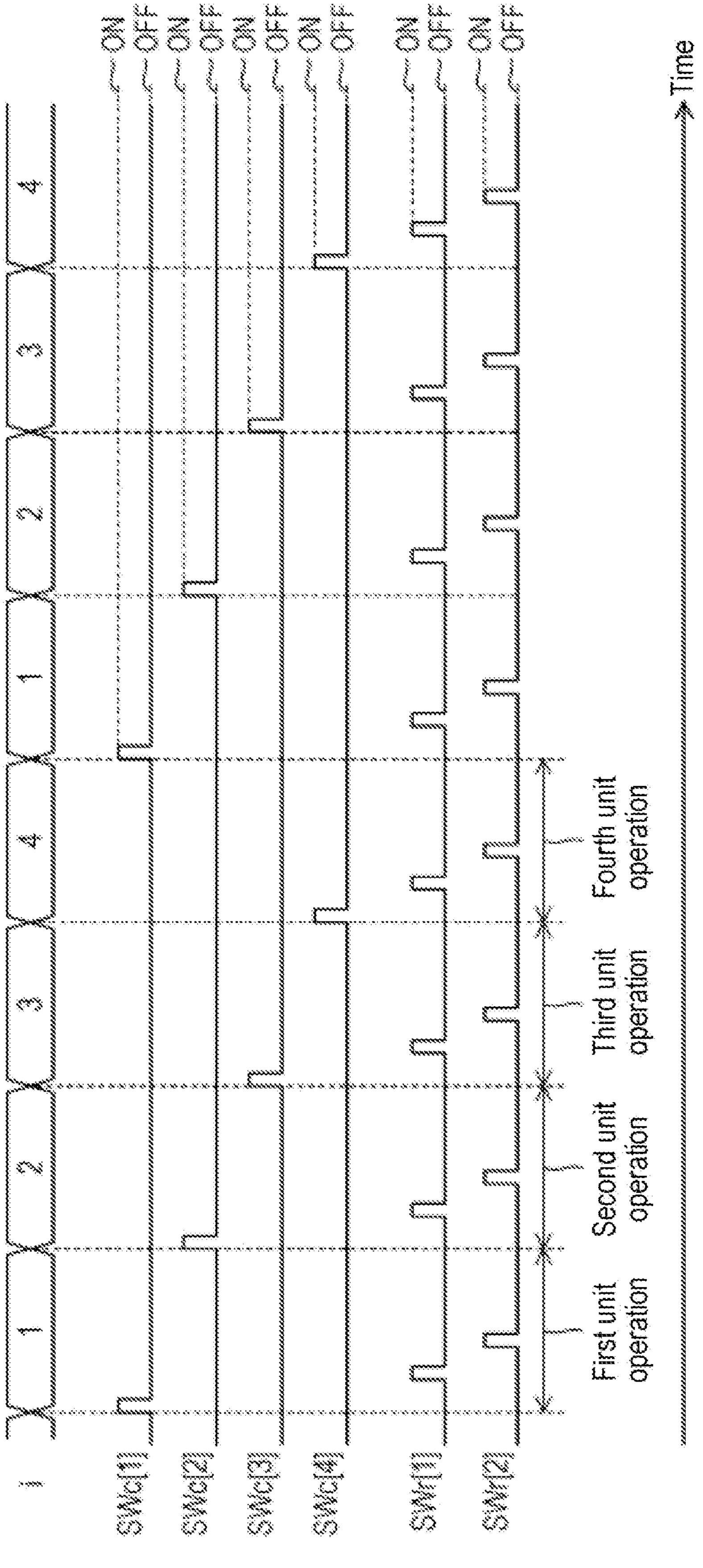
FIG. 8 is a timing chart diagram of basic light emission control according to the first Example belonging to the embodiment of the present disclosure.

FIG. 8 shows a relationship between the value of the variable i and the state of each switch in the basic light emission control. In the unit operation when "i=1" (that is, in the first unit operation), the control circuit 40 related to the light emitting device 1A turns on the charging switch SWc[1] for a predetermined time tc_on and then turns on the light emitting switches SWr[1] and SWr[2] sequentially at different timings, thereby causing the light emitting elements LD[1,1] and LD[1,2] to sequentially emit light. In the unit operation when "i=2" (that is, in the second unit operation), the control circuit 40 related to the light emitting device 1A turns on the charging switch SWc[2] for a predetermined time tc_on and then turns on the light emitting switches SWr[1] and SWr[2] sequentially at different timings, thereby causing the light emitting elements LD[2,1] and LD[2,2] to sequentially emit light. The same applies to each unit operation when "i≥3."

Generalizing, in the i-th unit operation, the control circuit 40 turns on the charging switch SWc[i] for a predetermined time tc_on and then turns on the light emitting switches SWr[1] to SWr[N] sequentially at different timings, thereby causing the light emitting elements LD[i, 1] to LD[i,N] to sequentially emit light. Further, in the basic light emission control, the control circuit 40 executes the first to M-th unit operations (the first to fourth unit operations in the light emitting device 1A) sequentially at different timings.

Figure 9:
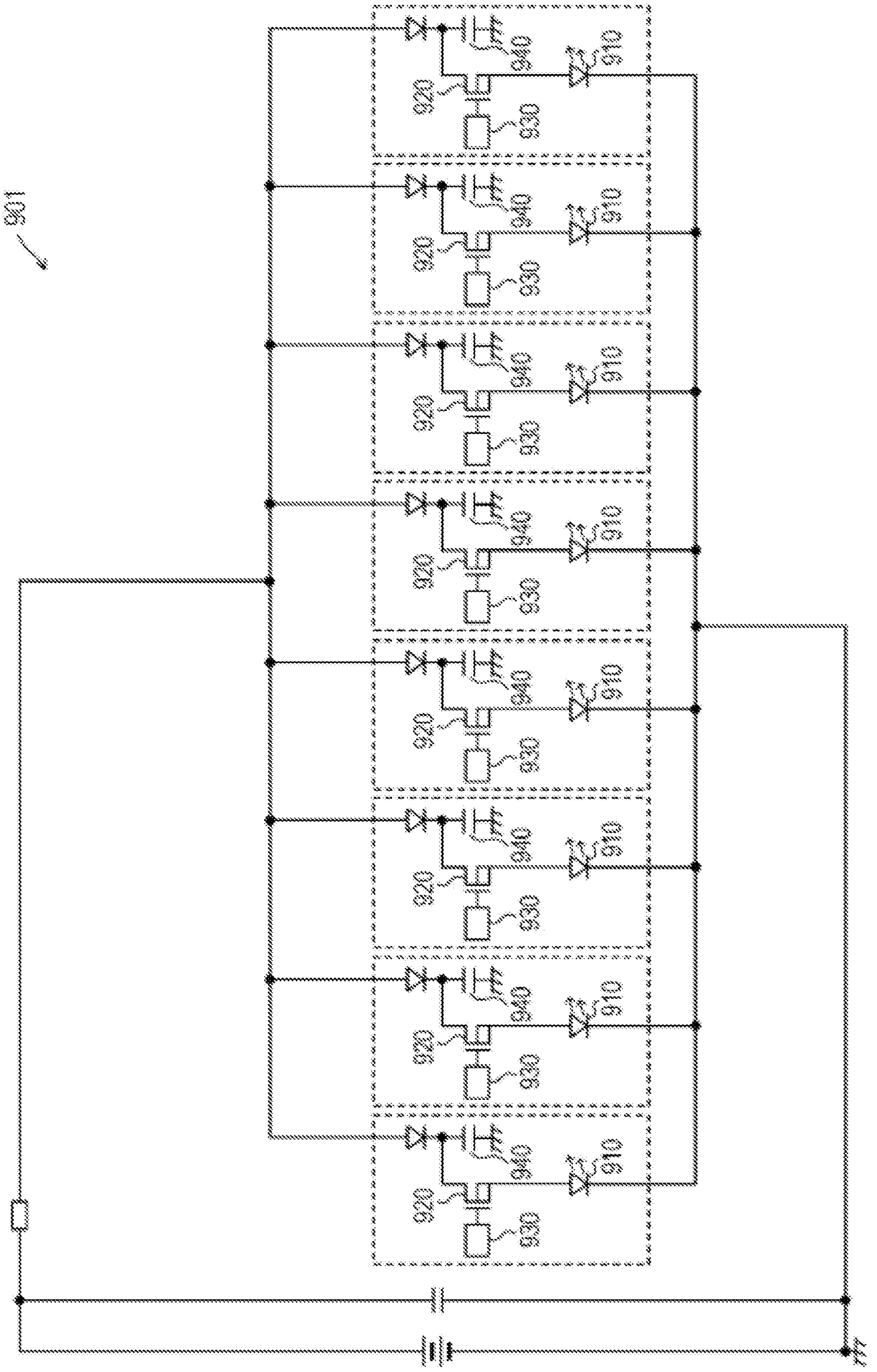
FIG. 9 is a diagram showing a light emitting device according to a reference configuration.

Here, FIG. 9 shows a light emitting device 901 according to a reference configuration. The light emitting device 901 requires a switch 920 for supplying or cutting off a current to a light emitting element 910 and a drive circuit 930 (gate drive circuit) for driving the switch 920 for each light emitting element 910. Further, in order to reduce the inductance component of an electric path of a current supplied to the light emitting element 910, a capacitor 940 is provided for each combination of the light emitting element 910 and the switch 920. For example, when eight light emitting elements 910 are provided, eight sets of switches 920 and drive circuits 930 are required. In addition, as shown in FIG. 9, if the source of a MOSFET as the switch 920 is not connected to the ground, a power supply (dedicated power supply) is required for each switch 920 to obtain the gate level for turning on/off the switch 920.

In contrast, in the light emitting device 1A of FIG. 3, six switches are sufficient to cause the eight light emitting elements LD to emit light individually. The control circuit 40 in the light emitting device 1A includes four gate drive circuits that supply the gate signals Gc[1] to Gc[4] to the charging switches SWc[1] to SWc[4], and two gate drive circuits that supply the gate signals Gr[1] and Gr[2] to the light emitting switches SWr[1] and SWr[2]. That is, in the light emitting device 1A of FIG. 3, six gate drive circuits are sufficient. In this way, in the light emitting device 1A of FIG. 3, as compared to the light emitting device 901 of FIG. 9, the required number of switches and the required number of gate drive circuits can be reduced, thereby reducing the circuit size. Reducing the circuit size leads to lower costs. In addition, in the light emitting device 1A, since the sources of the light emitting switches SWr[1] and SWr[2] are connected to the ground, there is no need for a dedicated power supply for driving the light emitting switches SWr[1] and SWr[2]. Eliminating the need for a dedicated power supply also leads to reduction in the circuit size.

In the light emitting device 1A of FIG. 3, it is assumed that "(M, N, L)-(4, 2, 8)," but these effects become more pronounced as the number of light emitting elements LD installed increases.

For example, if 16 light emitting elements 910 are installed in the light emitting device 901, 16 sets of switches 920 and drive circuits 930 are required. In contrast, in the light emitting device 1 (see FIG. 1) according to this embodiment, when the total number of light emitting elements LD is 16 (that is, when "L=16"), "(M, N)=(4, 4)," in which case, the required number of switches is 8 (the required number of gate drive circuits is also the same). Note that in the light emitting device 1, any combination of M and N that satisfies "L=M×N" can be adopted, and if the total number of light emitting elements LD is 16, for example, "(M, N)=(2, 8)" or "(M, N)=(8, 2)."

For example, if 64 light emitting elements 910 are installed in the light emitting device 901, 64 sets of switches 920 and drive circuits 930 are required. In contrast, in the light emitting device 1 (see FIG. 1) according to this embodiment, when the total number of light emitting elements LD is 64 (that is, when "L=64"), "(M, N)=(8, 8)," in which case, the required number of switches is 16 (the required number of gate drive circuits is also the same). Note that in the light emitting device 1, any combination of M and N that satisfies "L=M×N" can be adopted, and if the total number of light emitting elements LD is 64, for example, "(M, N)=(16, 4)" or "(M,N)=(4,16)."

In this manner, the light emitting device 1 can individually drive the number of light emitting elements LD corresponding to the product of the number (M) of charging switches SWc and the number (N) of light emitting switches SWr. However, as already mentioned, the total number of light emitting unit circuits U provided in any light emitting group GRP among the light emitting groups GRP[1] to GRP[N] may be less than M, in which case, "L<M×N." For example, when "L=15" in the light emitting device 1 (see FIG. 1), "(M, N)=(4,4)" is set, and then four light emitting unit circuits U may be provided in each of the light emitting groups GRP[1] to GRP[3] and only three light emitting unit circuits U may be provided in the light emitting group GRP[4]. In any case, it is preferable that "L>M+N" holds true, whereby the effect of reducing the number of switches can be obtained.

Here, the significance of the existence of the charging diode D[i,j] will be described. If a charging diode D is not provided in each light emitting unit circuit U, after charging the capacitors Cr[1,1] and Cr[1,2] in the state shown in FIG. 5, when the state changes to the state shown in FIG. 6, the accumulated charges of the capacitor Cr[1,2] are discharged through the charging wiring WRc[1] and the light emitting element LD[1,1], and as a result, the light emitting element LD[1,2] cannot emit light properly in the state shown in FIG. 7. By providing the charging diode D in each light emitting unit circuit U, it is possible to avoid such a phenomenon.

Figure 10:
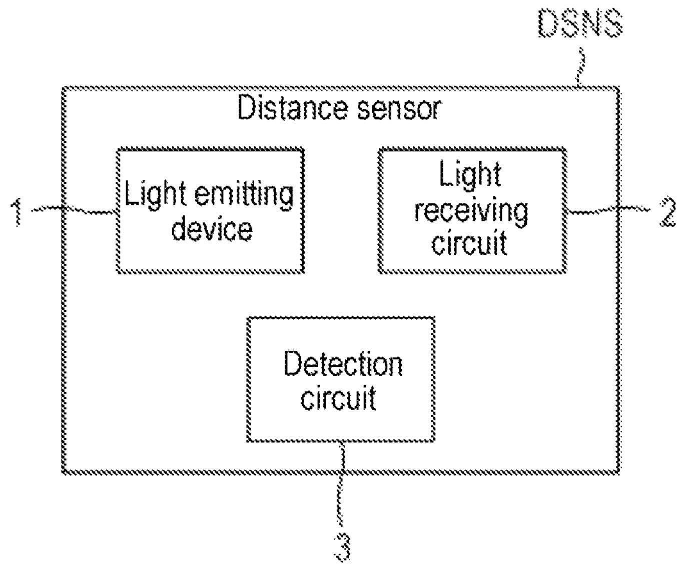
FIG. 10 is a block diagram of a distance sensor according to the first Example belonging to the embodiment of the present disclosure.

As shown in FIG. 10, the light emitting device 1 (the light emitting device 1A in this Example) can be used for a distance sensor DSNS. The distance sensor DSNS includes a light emitting device 1, a light receiving circuit 2, and a detection circuit 3. The distance sensor DSNS is installed on a reference object and measures a distance between the reference object and another object. The reference object is arbitrary, and may be, for example, a vehicle such as an automobile. Light exited from the light emitting element LD, which is generated by causing the light emitting element LD to emit light for a minute time, is reflected by another object, and the reflected light is received by the light receiving circuit 2. The detection circuit 3 calculates, for each light emitting element LD provided in the light emitting device 1, a difference between the time of light exit from the light emitting element LD (that is, the light emission time of the light emitting element LD) and the time of light reception of the reflected light by the light receiving circuit 2, and detects the distance between the reference object and another object based on the calculated difference.

When the distance sensor DSNS is provided with the light emitting device 1A as the light emitting device 1, the light exit directions of the eight light emitting elements LD may be made different from each other. In this case, it is possible to measure distances in the total of eight directions when seen from the reference object. Among the light exit directions of the eight light emitting elements LD, two or more exit directions may be the same. For example, the light exit direction of the light emitting element LD[1,1] and the light exit direction of the light emitting element LD[1,2] may be the same.

Second Example

Figure 11:
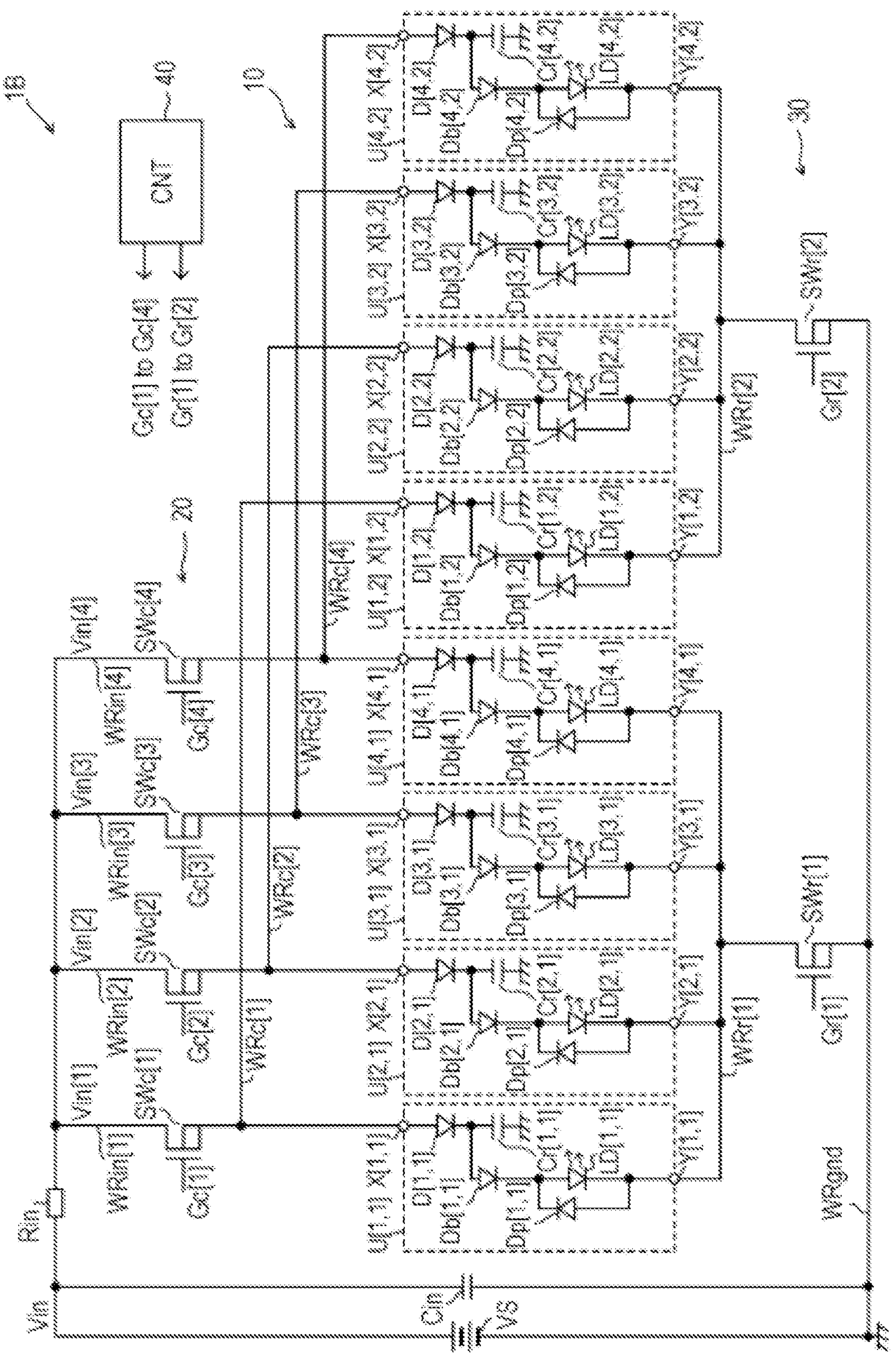
FIG. 11 is a configuration diagram of a light emitting device according to a second Example belonging to the embodiment of the present disclosure.

A second Example will be described. FIG. 11 shows a configuration of a light emitting device 1B which is the light emitting device 1 according to the second Example. In the light emitting device 1B, like the light emitting device 1A in FIG. 3, it is assumed that "M=4," "N=2," and "L=8." When seen from the light emitting device 1A of FIG. 3, a protection diode Dp and a backflow blocking diode Db are added to each light emitting unit circuit U in the light emitting device 1B. The light emitting device 1B includes the same configuration as the light emitting device 1A except for the addition of the protection diode Dp and the backflow blocking diode Db, and the description of the first Example also applies to the light emitting device 1B except for the addition.

Each light emitting unit circuit U in the light emitting device 1B includes a protection diode Dp and a backflow blocking diode Db in addition to a light emitting element LD, a capacitor Cr, and a charging diode D. The protection diode Dp and the backflow blocking diode Db in the light emitting unit circuit U[i,j] are referred to as a protection diode Dp[i,j] and a backflow blocking diode Db[i,j], respectively. Since eight light emitting unit circuits U provided in the light emitting device 1B include the same configuration, the configuration of the light emitting unit circuit U[i,j] will be described as a representative among the eight light emitting unit circuits U.

First, as described in the first Example, the charging diode D[i,j] is connected in series to the capacitor Cr[i,j] and has a forward direction from the charging switching circuit 20 toward the capacitor Cr[i,j]. Specifically, in the light emitting unit circuit U[i,j], the anode of the charging diode D[i,j] is connected to the input node X[i,j], and the cathode of the charging diode D[i,j] is connected to the first end of the capacitor Cr[i,j]. The second end of the capacitor Cr[i,j] is connected to the ground (in other words, connected to the ground wiring WRgnd).

The first end of the capacitor Cr[i,j] is connected to the first end of the light emitting element LD[i,j] through the backflow blocking diode Db[i,j]. More specifically, the first end of the capacitor Cr[i,j] is connected to the anode of the backflow blocking diode Db[i,j], and the cathode of the backflow blocking diode Db[i,j] is connected to the first end of the light emitting element LD[i,j]. The second end of the light emitting element LD[i,j] is connected to the output node Y[i,j]. The first end and the second end of the light emitting element LD[i,j] correspond to the anode and the cathode of the light emitting element LD[i,j], respectively. As a current flows from the first end to the second end of the light emitting element LD[i,j], the light emitting element LD[i,j] emits light.

The protection diode Dp[i,j] is connected in parallel to the light emitting element LD[i,j]. However, the forward direction of the protection diode Dp[i,j] and the forward direction of the light emitting element LD[i,j] are opposite to each other. That is, the anode of the protection diode Dp[i,j] is connected to the second end (cathode) of the light emitting element LD[i,j], and the cathode of the protection diode Dp[i,j] is connected to the first end (anode) of the light emitting element LD[i,j].

As a charging current is supplied to the capacitor Cr[i,j] through the charging switching circuit 20, charges are accumulated in the capacitor Cr[i,j], and when seen from the second end of the capacitor Cr[i,j], the potential of the first end of the capacitor Cr[i,j] increases by an amount corresponding to the accumulated charges. Thereafter, when the corresponding light emitting switch SWr[j] is turned on, a discharging current due to the accumulated charges of the capacitor Cr[i,j] flows through the backflow blocking diode Db[i,j], the light emitting element LD[i,j], and the light emitting switch SWr[j], whereby the light emitting element LD[i,j] emits light.

In the light emitting device 1A of FIG. 3, after the capacitor Cr[i,j] is discharged, a back electromotive force generated in the inductance component between the light emitting element LD[i, j] and the ground wiring WRgnd is applied as a reverse bias voltage to the light emitting element LD[i,j]. It is not preferable that an excessive reverse bias voltage be applied to the light emitting element LD[i,j]. By providing the protection diode Dp[i,j] as in the light emitting device 1B of FIG. 11, the application of an excessive reverse bias voltage to the light emitting element LD[i,j] is suppressed. However, when charges based on the reverse bias voltage flows into the capacitor Cr[i,j] through the protection diode Dp[i,j], the light emitting element LD[i,j] may emit light again based on the inflowing charges. The inflow of charges and the re-emission of light of the light emitting element LD[i,j] based on such a reverse bias voltage are suppressed by providing the backflow blocking diode Db[i, j].

An explanation about suppressing the re-emission will be added below. For example, after the capacitor Cr[1,1] is charged by turning on the charging switch SWc[1], the light emitting element LD[1,1] emits light by discharging of the capacitor Cr[1,1] by turning on the light emitting switch SWr[1]. After the discharging of the capacitor Cr[1,1] is completed, if the charges due to the back electromotive force flows into the capacitor Cr[1,1], the capacitor Cr[1,1] is recharged due to the inflow even if the charging switch SWc[1] is kept off, and the light emitting element LD[1,1] can emit light again due to the subsequent re-discharging of the capacitor Cr[1,1]. The light re-emission of the light emitting element LD[i,j] is unintended light emission, and if it is assumed to be used for the distance sensor DSNS, it will adversely affect distance detection accuracy. By installing the backflow blocking diode Db[1,1], a current flowing from the output node Y[1,1] to the capacitor Cr[1,1] is blocked, so that the light re-emission of the light emitting element LD[1,1] is suppressed.

Third Example

Figure 12:
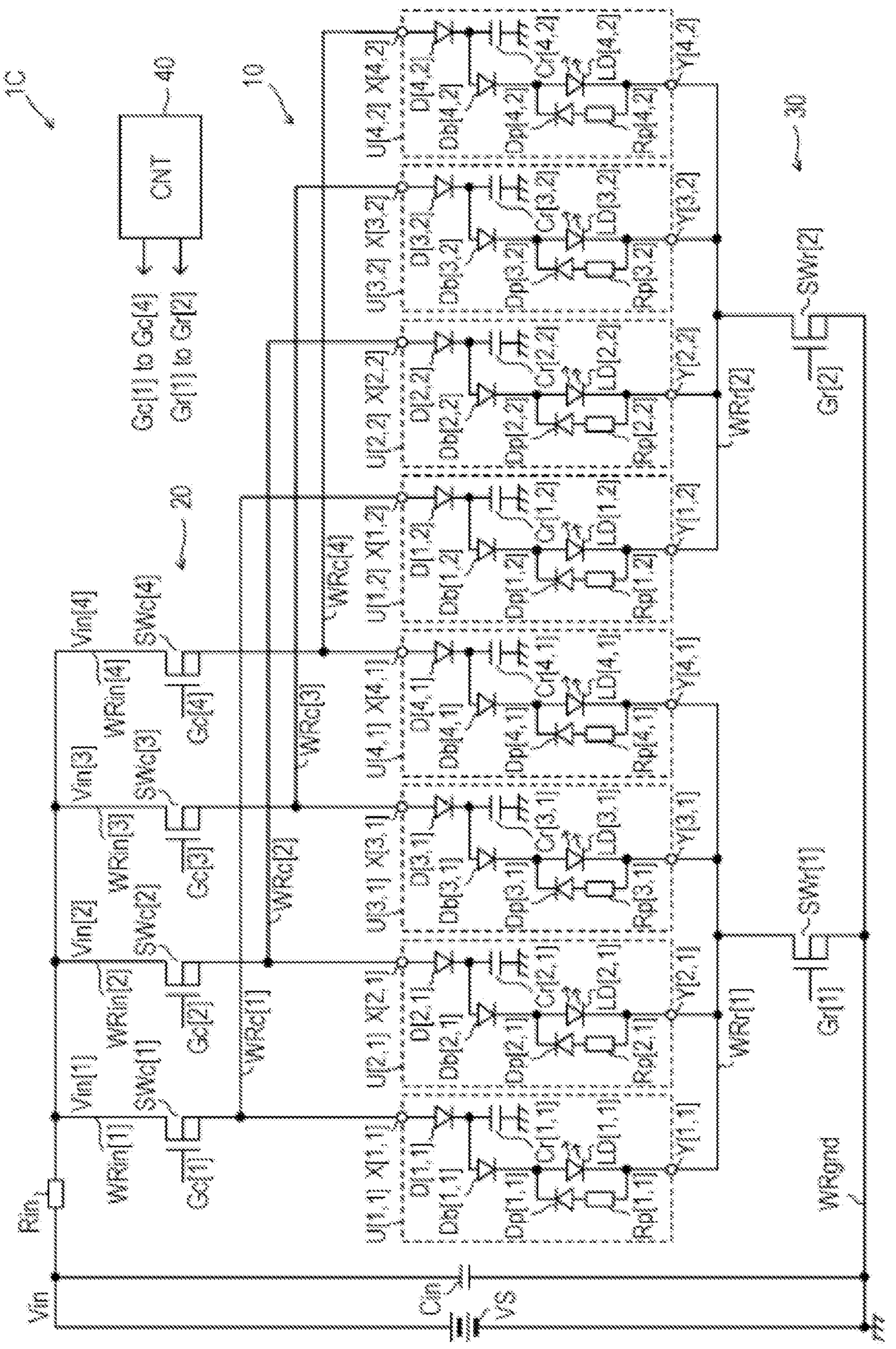
FIG. 12 is a configuration diagram of a light emitting device according to a third Example belonging to the embodiment of the present disclosure.

A third Example will be described. FIG. 12 shows a configuration of a light emitting device 1C which is the light emitting device 1 according to the third Example. In the light emitting device 1C, like the light emitting device 1A of FIG. 3 and the light emitting device 1B of FIG. 11, it is assumed that "M=4," "N=2," and "L=8." When seen from the light emitting device 1B of FIG. 11, a resistor Rp is added to each light emitting unit circuit U in the light emitting device 1C. The light emitting device 1C includes the same configuration as the light emitting device 1B except for the addition of the resistor Rp, and the description of the second Example also applies to the light emitting device 1C except for the addition. In other words, when seen from the light emitting device 1A of FIG. 3, a resistor Rp, a protection diode Dp, and a backflow blocking diode Db are added to each light emitting unit circuit U in the light emitting device 1C. The light emitting device 1C includes the same configuration as the light emitting device 1A except for the addition of the resistor Rp, the protection diode Dp, and the backflow blocking diode Db, and the description of the first Example also applies to the light emitting device 1C except for the addition.

Each light emitting unit circuit U in the light emitting device 1C includes a resistor Rp in addition to a light emitting element LD, a capacitor Cr, a charging diode D, a protection diode Dp, and a backflow blocking diode Db. The resistor Rp in the light emitting unit circuit U[i,j] is referred to as a resistor Rp[i,j]. Since eight light emitting unit circuits U provided in the light emitting device 1C include the same configuration, the configuration of the light emitting unit circuit U[i,j] will be described as a representative among the eight light emitting unit circuits U.

In the light emitting unit circuit U[i,j], the resistor Rp[i,j] is connected in series to the protection diode Dp[i,j], and a series circuit of the resistor Rp[i,j] and the protection diode Dp[i,j] is connected in parallel to the light emitting element LD[i,j]. In other words, in the light emitting device 1C, a parallel circuit is connected in parallel to the light emitting element LD[i,j], and the parallel circuit includes the protection diode Dp[i,j] and the resistor Rp[i,j] connected in series to the protection diode Dp[i,j].

More specifically, the cathode of the protection diode Dp[i,j] is connected to the first end (anode) of the light emitting element LD[i,j]. The anode of the protection diode Dp[i,j] is connected to the second end (cathode) of the light emitting element LD[i,j] via the resistor Rp[i,j]. The arrangement positions of the protection diode Dp[i,j] and the resistor Rp[i,j] may be reversed. The connection relationships among the charging diode D[i,j], the capacitor Cr[i,j], the backflow blocking diode Db[i,j], and the light emitting element LD[i,j] are as described in the second Example.

As described in the second Example, by installing the backflow blocking diode Db[i,j], it is possible to suppress the inflow of charges and the light re-emission of the light emitting element LD[i,j] based on a reverse bias voltage. However, when a reverse bias voltage is generated for the light emitting element LD[i,j], as the reverse bias voltage is also applied to the reverse current blocking diode Db[i,j], a recovery current in the backflow blocking diode Db[i,j] may contribute to recharging of the capacitor Cr[i,j]. The recharging of the capacitor Cr[i,j] causes the light emitting element LD[1,1] to emit light again as described in the second Example, and if it is assumed to be used for the distance sensor DSNS, it will adversely affect distance detection accuracy.

In the light emitting device 1C, by providing the resistor Rp[i,j], the recharging of the capacitor Cr[i,j] is suppressed more strongly than in the light emitting device 1B.

Fourth Example

Figure 13:
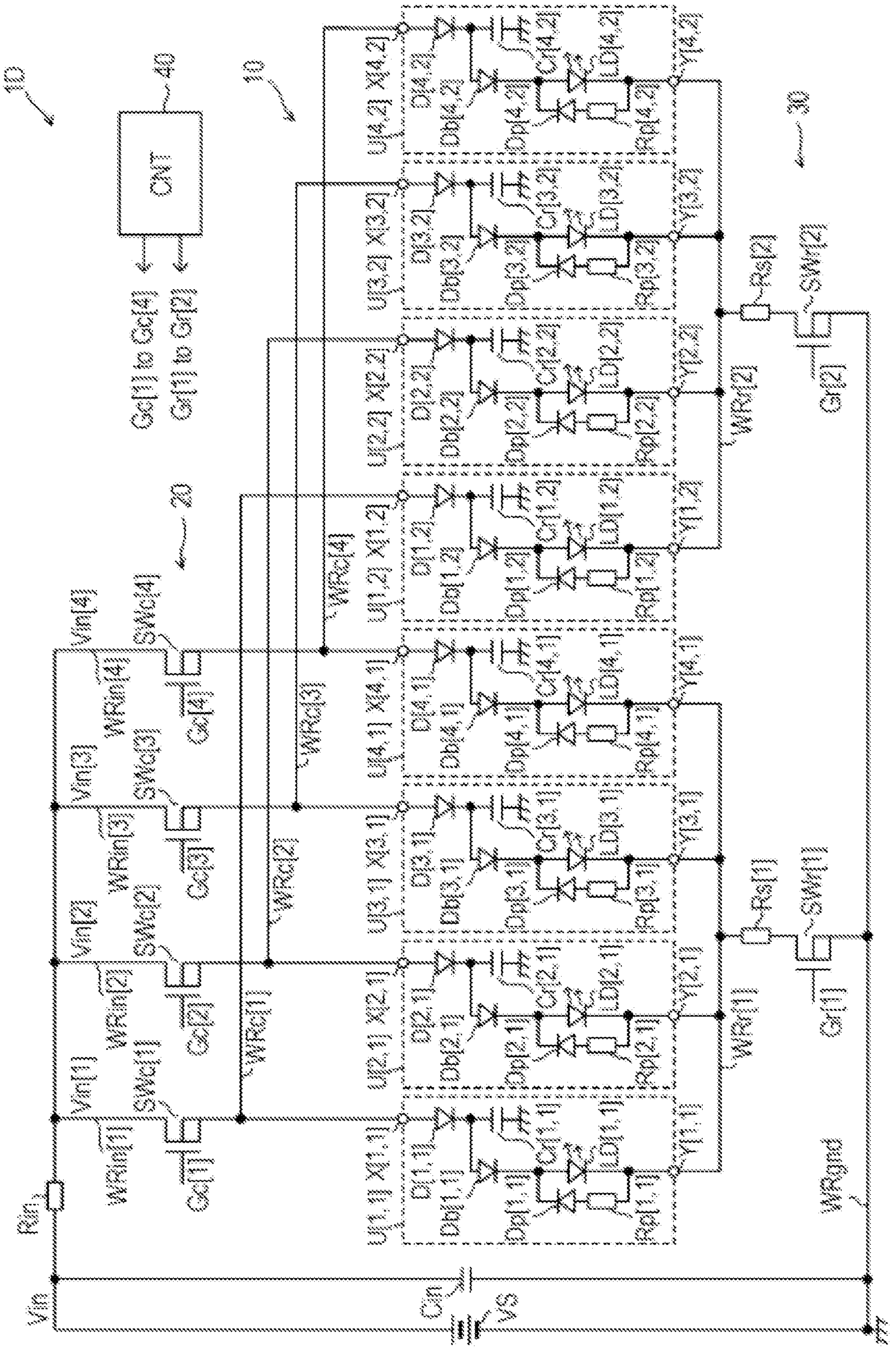
FIG. 13 is a configuration diagram of a light emitting device according to a fourth Example belonging to the embodiment of the present disclosure.

A fourth Example will be described. In the light emitting device 1, a shunt resistor Rs may be connected in series to each light emitting switch SWr. As an example of the light emitting device 1 including the shunt resistor Rs, a configuration of a light emitting device 1D is shown in FIG. 13. The light emitting device 1D of FIG. 13 is the light emitting device 1C of FIG. 12 with the shunt resistor Rs added thereto. However, the shunt resistor Rs may be added to the light emitting device 1A of the first Example or the light emitting device 1B of the second Example.

In the light emitting device 1D, the shunt resistor Rs is provided for each light emitting switch SWr. The shunt resistor Rs provided for the light emitting switch SWr[j] is referred to as a shunt resistor Rs[j]. The shunt resistor Rs[j] is connected in series to the light emitting switch SWr[j], and the shunt resistor Rs[j] is arranged at a position through which the total current flowing to the light emitting switch SWr[j] passes.

In the light emitting device 1D of FIG. 13, the shunt resistor Rs[1] is interposed in series between the light emitting wiring WRr[1] and the light emitting switch SWr [1], and the shunt resistor Rs[2] is interposed in series between the light emitting wiring WRr[2] and the light emitting switch SWr[2]. That is, the first end of the shunt resistor Rs[j] is connected to the light emitting wiring WRr[j], and the second end of the shunt resistor Rs[j] is connected to the drain of the light emitting switch SWr[j]. Each of the sources of the light emitting switches SWr[1] and SWr[2] is connected to the ground wiring WRgnd.

The control circuit 40 can detect a current flowing through the light emitting switch SWr[1] by detecting a voltage drop occurring in the shunt resistor Rs[1] (that is, a voltage across the shunt resistor Rs[1]), and can detect a current flowing through the light emitting switch SWr[2] by detecting a voltage drop occurring in the shunt resistor Rs[2] (that is, a voltage across the shunt resistor Rs[2]). The control circuit 40 can determine whether or not an appropriate current is being supplied to each light emitting element LD based on the detection results of these currents, and can variably set (change) the output voltage Vin of the voltage source VS as necessary.

When the method shown in this Example is applied to the light emitting device 1 of FIG. 1, although not particularly shown, for each integer j satisfying "1<j<N," the shunt resistor Rs[j] may be inserted between the light emitting wiring WRr[j] and the light emitting switch SWr[j].

Fifth Example

Figure 14:
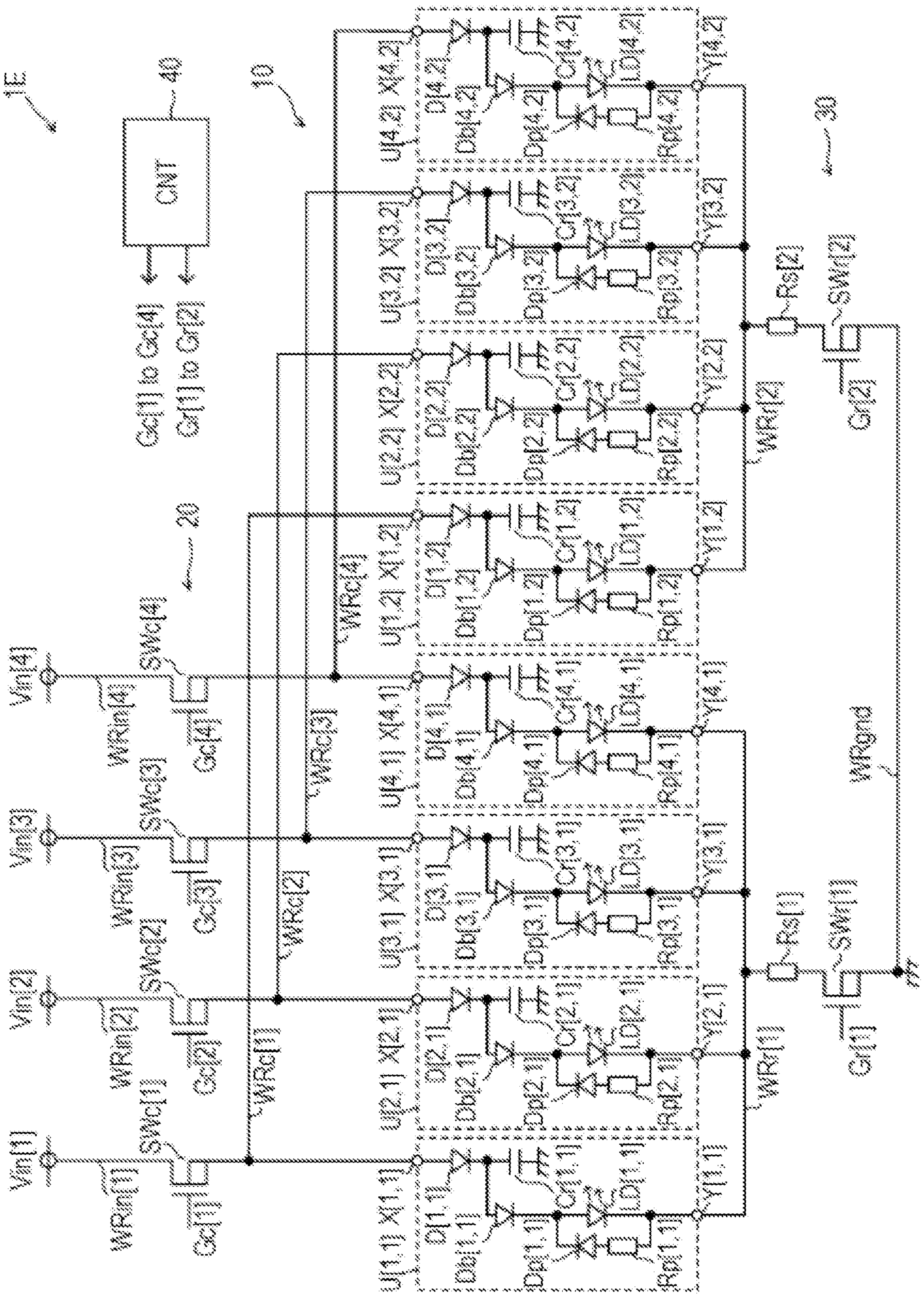
FIG. 14 is a configuration diagram of a light emitting device according to a fifth Example belonging to the embodiment of the present disclosure.
Figure 15:
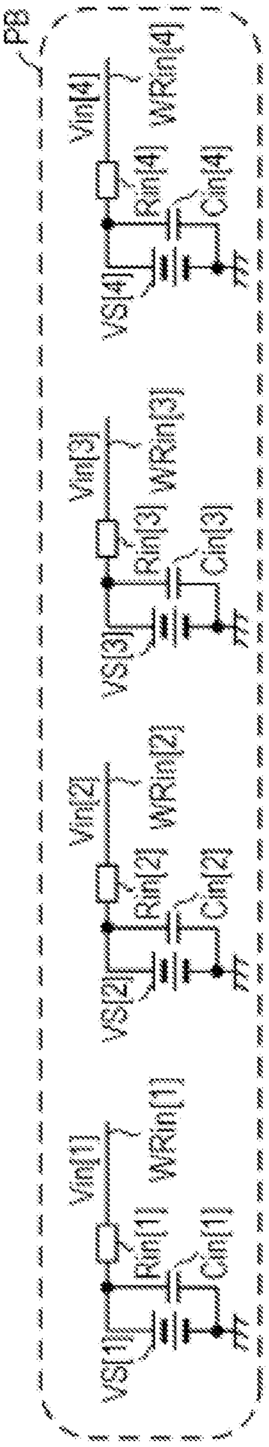
FIG. 15 is a configuration diagram of a power supply block according to the fifth Example belonging to the embodiment of the present disclosure.

A fifth Example will be described. In the above-described first to fourth Examples, the input voltages Vin[1] to Vin[4] may be four input voltages independent of each other. FIG. 14 shows a configuration of a light emitting device 1E which is the light emitting device 1 according to the fifth Example. The light emitting device 1E is obtained by modifying the light emitting device 1D of FIG. 13 to make the input voltages Vin[1] to Vin[4] as four input voltages that are independent of each other. Similar modification may be applied to the light emitting device 1A, 1B, or 1C. FIG. 15 is a configuration diagram of a power supply block PB according to the fifth Example. The power supply block PB is provided in the light emitting device 1E or externally connected to the light emitting device 1E.

The power supply block PB includes four voltage sources VS[1] to VS[4] that are independent of each other, and a set of input capacitor Cin and input resistor Rin is provided for each of the voltage sources VS[1] to VS[4]. The input capacitor Cin and the input resistor Rin provided for the voltage source VS[i] are referred to as an input capacitor Cin[i] and an input resistor Rin[i], respectively. For each integer i satisfying "1≤i≤4," an input voltage Vin[i] is output from a set of voltage source VS[i], input capacitor Cin[i], and input resistor Rin[i].

The voltage source VS[i] includes a positive output terminal and a negative output terminal connected to the ground and outputs a positive DC voltage from the positive output terminal. The input capacitor Cin[i] is connected between the negative output terminal and the positive output terminal of the voltage source VS[i]. The positive output terminal of the voltage source VS[i] is connected to the input wiring WRin[i] via the input resistor Rin[i]. The input resistor Rin[i] limits a current flowing through the charging switch SWc[i] so that the current does not become excessive during an on period of the charging switch SWc[i]. A voltage drop caused by the input resistor Rin[i] is ignored as it is sufficiently small. Then, the output voltage of the voltage source VS[i] (that is, a voltage at the positive output terminal of the voltage source VS[i]) is applied as the input voltage Vin[i] to the drain of the charging switch SWc[i].

In the light emitting device 1E, the light emission intensity of each light emitting element LD can be adjusted by adjusting the input voltages Vin[1] to Vin[4]. For example, when "Vin[1]>Vin[2]," the charging voltages of the capacitors Cr[1,1] and Cr[1,2] during the on period of the charging switch SWc[1] are higher than the charging voltages of the capacitors Cr[2,1] and Cr[2,2] during the on period of the charging switch SWc[2]. As a result, the light emission intensities of the light emitting elements LD[1,1] and LD[1, 2] can be made higher than the light emission intensities of the light emitting elements LD[2,1] and LD[2,2].

When the distance sensor DSNS is configured using the light emitting device 1E, the input voltages Vin[1] to Vin[4] may be adjusted depending on the range of distance to be measured. It may be considered that a possible usage method is to associate a higher input voltage with a light emitting element LD used to measure a farther distance.

Note that it is not necessary to make all the input voltages Vin[1] to Vin[4] independent from each other. For example, the power supply block PB is provided with only a first voltage source and a second voltage source, and while the output voltage of the first voltage source is used as the input voltages Vin[1] and Vin[2], the output voltage of the second voltage source may be used as the input voltages Vin[3] and Vin[4].

Sixth Example

A sixth Example will be described. In the light emitting device 1E according to the fifth Example, the control circuit 40 can detect the current flowing through the light emitting switches SWr[1] and SWr[2] using the shunt resistors Rs[1] and Rs[2]. One or more of the input voltages Vin[1] to Vin[4] may be variably set based on the current detection results. In the sixth Example, it is assumed that the voltage sources VS[1] to VS[4] are variable voltage sources and the voltage sources VS[1] to VS[4] are configured so that the input voltages Vin[1] to Vin[4] can be changed individually under the control of the control circuit 40 (this may be the same in other Examples).

Figure 16:
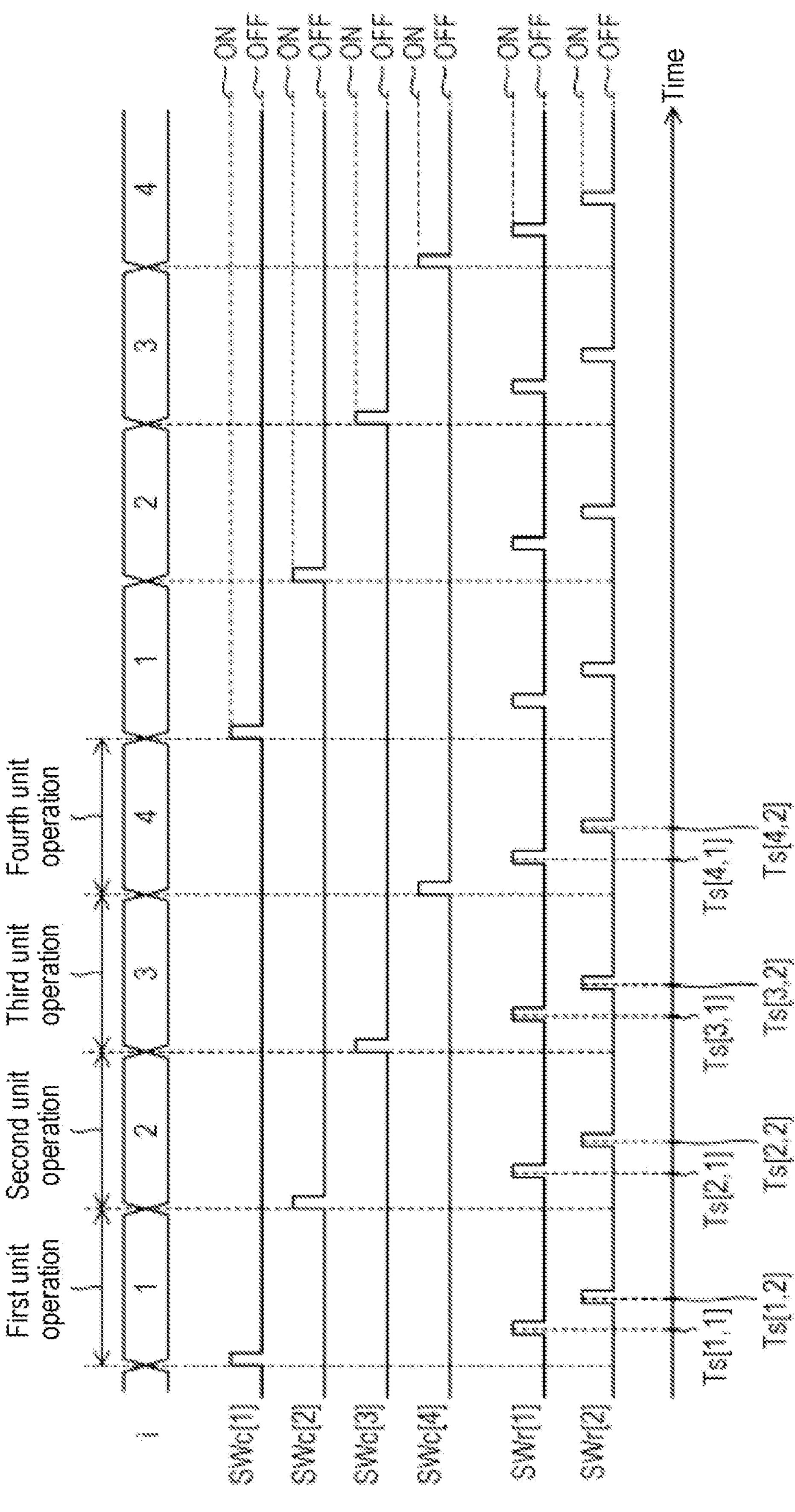
FIG. 16 is a diagram for explaining sampling times related to current detection according to a sixth Example belonging to the embodiment of the present disclosure.

A method of setting an input voltage according to the sixth Example will be described assuming that the basic light emission control shown in FIG. 4 is applied to the light emitting device 1E. See FIG. 16.

In the unit operation when "i=1" (that is, the first unit operation), the control circuit 40 sets the time when a predetermined minute time ΔT has elapsed since the light emitting switch SWr[1] was switched from the off state to the on state, to a sampling time Ts[1,1]. The control circuit 40 detects a voltage drop occurring in the shunt resistor Rs[1] at the sampling time Ts[1,1], as a sense voltage Vsns[1,1]. In the unit operation when "i=1" (that is, the first unit operation), the control circuit 40 sets the time when a predetermined minute time ΔT has elapsed since the light emitting switch SWr[2] was switched from the off state to the on state, to a sampling time Ts[1,2]. The control circuit 40 detects a voltage drop occurring in the shunt resistor Rs[2] at the sampling time Ts[1,2], as a sense voltage Vsns[1,2].

Similarly, in the unit operation when "i=2" (that is, the second unit operation), the control circuit 40 sets the time when a predetermined minute time ΔT has elapsed since the light emitting switch SWr[1] was switched from the off state to the on state, to a sampling time Ts[2,1]. The control circuit 40 detects a voltage drop occurring in the shunt resistor Rs[1] at the sampling time Ts[2,1], as a sense voltage Vsns[2,1]. In the unit operation when "i=2" (that is, the second unit operation), the control circuit 40 sets the time when a predetermined minute time ΔT has elapsed since the light emitting switch SWr[2] was switched from the off state to the on state, to a sampling time Ts[2,2]. The control circuit 40 detects a voltage drop occurring in the shunt resistor Rs[2] at the sampling time Ts[2,2], as a sense voltage Vsns[2,2]. The same applies when "i=3" or "i=4."

Generalizing, in the i-th unit operation, the control circuit 40 sets the time when a predetermined minute time ΔT has elapsed since the light emitting switch SWr[j] was switched from the off state to the on state, to a sampling time Ts[i,j]. The control circuit 40 detects a voltage drop occurring in the shunt resistor Rs[j] at the sampling time Ts[i,j], as a sense voltage Vsns[i,j]. A set of first to fourth unit periods occurs periodically. For each set of first to fourth unit periods, eight sampling times Ts are set and eight sense voltages Vsns are detected. The eight sampling times Ts refer to sampling times Ts[1,1], Ts[1,2], Ts[2,1], Ts[2,2], Ts[3,1], Ts[3,2], Ts[4,1], and Ts[4,2]. The eight sense voltages Vsns refer to sense voltages Vsns[1,1], Vsns[1,2], Vsns[2, 1], Vsns[2,2], Vsns[3,1], Vsns[3,2], Vsns[4,1], and Vsns[4,2].

The predetermined minute time ΔT is shorter than the above-mentioned predetermined time tr_on (see step S13 in FIG. 4). Therefore, the sampling time Ts[i,j] belongs to the on period of the light emitting switch SWr[j] and also belongs to a period during which a discharging current due to the accumulated charges of the capacitor Cr[i,j] flows through the light emitting element LD[i,j] and the light emitting switch SWr[j]. The sense voltage Vsns[i,j] represents a detected value of a current flowing through the light emitting switch SWr[j] at the sampling time Ts[i,j] and also represents a detected value of a current flowing through the light emitting element LD[i,j] during the light emitting period of the light emitting element LD[i,j]. Since the light emission intensity of the light emitting element LD[i,j] increases as the current flowing through the light emitting element LD[i,j] increases, the larger the sense voltage Vsns [i,j] is, the more the light emission intensity of the light emitting element LD[i,j] is.

The control circuit 40 can variably set one or more input voltages among the input voltages Vin[1] to Vin[4] based on all or some of the eight sense voltages Vsns.

For example, the control circuit 40 can perform first current specification control. In the first current specification control, the control circuit 40 adjusts the input voltage Vin[i] so that the sense voltage Vsns[i, 1] matches a predetermined specified voltage Vspc. This allows the light emitting element LD[i, 1] to emit light at a specified intensity. The control circuit 40 can perform the first current specification control for any integer i satisfying "1≤i≤4." In the first current specification control, the control circuit 40 may correct the input voltage Vin[i] to increase if "Vsns[i,1]<Vspc," and may correct the input voltage Vin[i] to decrease if "Vsns[i,1]>Vspc."

Alternatively, for example, the control circuit 40 can perform second current specification control. In the second current specification control, the control circuit 40 adjusts the input voltage Vin[i] so that the sense voltage Vsns[i,2] matches a predetermined specified voltage Vspc. This allows the light emitting element LD[i,2] to emit light at a specified intensity. The control circuit 40 can perform the second current specification control for any integer i satisfying "1≤i≤4." In the second current specification control, the control circuit 40 may correct the input voltage Vin[i] to increase if "Vsns[i,2]<Vspc," and may correct the input voltage Vin[i] to decrease if "Vsns[i,2]>Vspc."

Further alternatively, for example, the control circuit 40 can perform third current specification control. In the third current specification control, the control circuit 40 adjusts the input voltage Vin[i] so that the average of the sense voltages Vsns[i, 1] and Vsns[i,2] matches a predetermined specified voltage Vspc. This allows the average emission intensity of the light emitting elements LD[i, 1] and LD[i,2] to be set to a specified intensity. The control circuit 40 can perform the third current specification control for any integer i satisfying "1≤i≤4." In the third current specification control, the control circuit 40 may correct the input voltage Vin[i] to increase if the average of the sense voltages Vsns[i, 1] and Vsns[i,2] is lower than the specified voltage Vspc, and may correct the input voltage Vin[i] to decrease if the average of the sense voltages Vsns[i, 1] and Vsns[i,2] is higher than the specified voltage Vspc.

Further, for example, the control circuit 40 can perform first equalization control. In the first equalization control, the control circuit 40 adjusts the input voltages Vin[1] to Vin[4] so that the sense voltages Vsns[1,1], Vsns[2,1], Vsns[3,1], and Vsns[4,1] are equalized (same). This allows the light emission intensities of the light emitting elements LD[1,1] to LD[4,1] to be equalized. When the first equalization control is adopted when forming a module in which the light emitting elements LD[1,1] to LD[4,1] are grouped together, a thermal stress in the module can be suppressed to a low level. In the first equalization control, for example, the control circuit 40 may correct the input voltage Vin[1] to increase if the sense voltage Vsns[1,1] is lower than the other sense voltages Vsns[2,1], Vsns[3,1], and Vsns[4,1], and may correct the input voltage Vin[1] to decrease if the sense voltage Vsns[1,1] is higher than the other sense voltages Vsns[2,1], Vsns[3,1], and Vsns[4,1].

Further, for example, the control circuit 40 can perform second equalization control. In the second equalization control, the control circuit 40 adjusts the input voltages Vin[1] to Vin[4] so that the sense voltages Vsns[1,2], Vsns[2,2], Vsns[3,2], and Vsns[4,2] are equalized (same). This allows the light emission intensities of the light emitting elements LD[1,2] to LD[4,2] to be equalized. When the second equalization control is adopted when forming a module in which the light emitting elements LD[1,2] to LD[4,2] are grouped together, a thermal stress in the module can be suppressed to a low level. In the second equalization control, for example, the control circuit 40 may correct the input voltage Vin[1] to increase if the sense voltage Vsns[1,2] is lower than the other sense voltages Vsns[2,2], Vsns[3,2], and Vsns[4,2], and may correct the input voltage Vin[1] to decrease if the sense voltage Vsns[1,2] is higher than the other sense voltages Vsns[2,2], Vsns[3,2], and Vsns[4,2].

Further, for example, the control circuit 40 can perform third equalization control. In the third equalization control, the control circuit 40 calculates a first average voltage that is the average of the sense voltages Vsns[1,1] and Vsns[1,2], a second average voltage that is the average of the sense voltages Vsns[2,1] and Vsns[2,2], a third average voltage that is the average of the sense voltages Vsns[3,1] and Vsns[3,2], and a fourth average voltage that is the average of the sense voltages Vsns[4,1] and Vsns[4,2], and adjusts the input voltages Vin[1] to Vin[4] so that the first to fourth average voltages are equalized (same). This allows the average emission intensity of the light emitting elements LD[1,1] and LD[1,2], the average emission intensity of the light emitting elements LD[2,1] and LD[2,2], the average emission intensity of the light emitting elements LD[3,1] and LD[3,2], and the average emission intensity of the light emitting elements LD[4,1] and LD[4,2] to be equalized. This leads to homogenization of heat generation distribution within the light emitting device 1E. In the third equalization control, for example, the control circuit 40 may correct the input voltage Vin[1] to increase if the first average voltage is lower than the second to fourth average voltages, and may correct the input voltage Vin[1] to decrease if the first average voltage is higher than the second to fourth average voltages.

Instead of detecting the current flowing through the light emitting switches SWr[1] and SWr[2], a first modified detection method may be adopted in which currents flowing through the charging switches SWc[1] to SWc[4] are individually detected. In this case, for example, a shunt resistor (not shown) may be inserted into each of the input wirings WRin[1] to WRin[4], and a voltage drop across each shunt resistor may be detected. Then, the control circuit 40 may variably set one or more input voltages among the input voltages Vin[1] to Vin[4] based on the detection results of the currents flowing through the charging switches SWc[1] to SWc[4]. At this time, the control circuit 40 may variably set one or more input voltages among the input voltages Vin[1] to Vin[4] based on the detection results of the currents flowing through the charging switches SWc[1] to SWc[4] so as to obtain the same operation as the first, second, or third current specification control or the first, second, or third equalization control.

Instead of detecting the current flowing through the light emitting switches SWr[1] and SWr[2], a second modified detection method may be adopted in which currents flowing through the eight light emitting elements LD are individually detected. In this case, for example, in each light emitting unit circuit U, a shunt resistor (not shown) is inserted between the light emitting element LD and the output node Y or between the light emitting element LD and the charging diode D, and a voltage drop across each shunt resistor may be detected. Then, the control circuit 40 may variably set one or more input voltages among the input voltages Vin[1] to Vin[4] based on the detection results of the currents flowing through the eight light emitting elements LD. At this time, the control circuit 40 may variably set one or more input voltages among the input voltages Vin[1] to Vin[4] based on the detection results of the currents flowing through the eight light emitting elements LD so as to obtain the same operation as the first, second, or third current specification control or the first, second, or third equalization control.

A light detection circuit (not shown) that detects the light emission intensity of each light emitting element LD may be provided in the light emitting device 1 (here, the light emitting device 1E). Then, the control circuit 40 may variably set one or more input voltages among the input voltages Vin[1] to Vin[4] based on the detection result of the light detection circuit so as to obtain the same operation as the first, second, or third current specification control or the first, second, or third equalization control.

Seventh Example

A seventh Example will be described. In the light emitting device 1E according to the fifth Example, the control circuit 40 can variably set the on-duties of the charging switches SWc[1] to SWc[4] based on a level relationship between the input voltages Vin[1] to Vin[4]. An explanation of this will be added below. The on-duty of the charging switch SWc[i] refers to the ratio of the on period of the charging switch SWc[i] to the sum of the on period of the charging switch SWc[i] and the off period of the charging switch SWc[i].

In the seventh Example, the control circuit 40 can perform the above-described first to fourth unit operations (see FIGS. 4 and 8). At this time, the control circuit 40 can periodically execute each of the first to fourth unit operations. In the basic light emission control shown in FIG. 4, the execution period of the first unit operation, the execution period of the second unit operation, the execution period of the third unit operation, and the execution period of the fourth unit operation are equal to each other and match the execution period of the basic light emission control.

In contrast, the control circuit 40 according to the seventh Example can individually set and change the execution period of the first unit operation, the execution period of the second unit operation, the execution period of the third unit operation, and the execution period of the fourth unit operation. The length of the execution period of the i-th unit operation is represented by symbol "$t_{PERIOD}$[i]." On the other hand, the length of the on period of the charging switch SWc[i] in one i-th unit operation is a predetermined time tc_on (see FIG. 4). That is, the control circuit 40 turns on the charging switch SWc[i] for the predetermined time tc_on within the time $t_{PERIOD}$[i]. Then, the on-duty of the charging switch SWc[i] is "tc_on/$t_{PERIOD}$[i]."

The control circuit 40 according to the seventh Example sets the on-duty of a charging switch SWc[p] to be lower than the on-duty of a charging switch SWc[q] when the input voltage Vin[p] is higher than the input voltage Vin[q]. Here, p and q represent different natural numbers of M or less, and in the light emitting device 1E, "M=4." Specifically, for example, when "Vin[1]>Vin[2]," the control circuit 40 sets the on-duty of the charging switch SWc[1] to be lower than the on-duty of the charging switch SWc[2] by setting "$t_{PERIOD[1]}>t_{PERIOD[2]}$." At this time, it does not matter whether or not "Vin[2]=Vin[3]=Vin[4]."

When "Vin[1]>Vin[2]," the light emission intensities of the light emitting elements LD (LD[1,1] and LD[1,2]) corresponding to the input voltage Vin[1] and the charging switch SWc[1] become higher than the light emission intensities of the light emitting elements LD (LD[2,1] and LD[2,2]) corresponding to the input voltage Vin[2] and the charging switch SWc[2], and accordingly, the amount of heat generated per one light emission is larger in the former light emitting elements LD than in the latter light emitting elements LD. At this time, by setting the on-duty of the charging switch SWc[1] to be lower than the on-duty of the charging switch SWc[2] (in other words, by setting the execution period of the first unit operation to be lower than the execution period of the second unit operation), it is possible to reduce a difference in the amount of heat generated between a plurality of light emitting elements LD.

For example, when "Vin[1]>Vin[2]=Vin[3]=Vin[4]," by setting the on-duty of the charging switch SWc[1] to be lower than the on-duty of each of the charging switches SWc[2] to SWc[4], it is possible to reduce a difference between the amount of heat generated by the light emitting element LD[1,1] and the amount of heat generated by each of the light emitting elements LD[2,1] to [4,1]. Then, when forming a module in which the light emitting elements LD[1,1] to LD[4,1] are grouped together, a thermal stress in the module can be suppressed to a low level. The same applies to a case of forming a module in which the light emitting elements LD[1,2] to LD[4,2] are grouped together. Even when a module is not formed, since a difference in heat generation between a plurality of light emitting elements LD can be reduced by setting the on-duty using the above-described method, a thermal stress on a substrate on which a plurality of light emitting elements LD are mounted can be reduced.

Note that the above-described on-duty setting method in the seventh Example may be implemented arbitrarily. Therefore, for example, when "Vin[1]>Vin[2]," the control circuit 40 can match the on-duty of the charging switch SWc[1] with the on-duty of the charging switch SWc[2]. It is also possible to set the on-duty of the charging switch SWc[1] to be higher than the on-duty of the charging switch SWc[2].

Eighth Example

An eighth Example will be described. In the above-described basic light emission control (see FIG. 4), the first to fourth unit operations are executed at different timings, but the control circuit 40 may perform light emission control including control in which a plurality of charging switches SWc are turned on simultaneously.

For example, the above-described basic light emission control may be modified to simultaneously execute the first unit operation and the third unit operation (see also FIG. 8). The modified basic light emission control is referred to as light emission control of the eighth Example. In the light emission control of the eighth Example, a mixed unit operation and the second and fourth unit operations are executed. In the mixed unit operation, the control circuit 40 turns on the charging switches SWc[1] and SWc[3] simultaneously for a predetermined time tc_on and then turns off the charging switches SWc[1] and SWc[3], and then turns on the light emitting switches SWr[1] and SWr[2] sequentially for a predetermined time tr_on. In the light emission control of the eighth Example, the mixed unit operation, the second unit operation, and the fourth unit operation are executed at different timings. However, the second and fourth unit operations may also be executed simultaneously.

Figure 17:
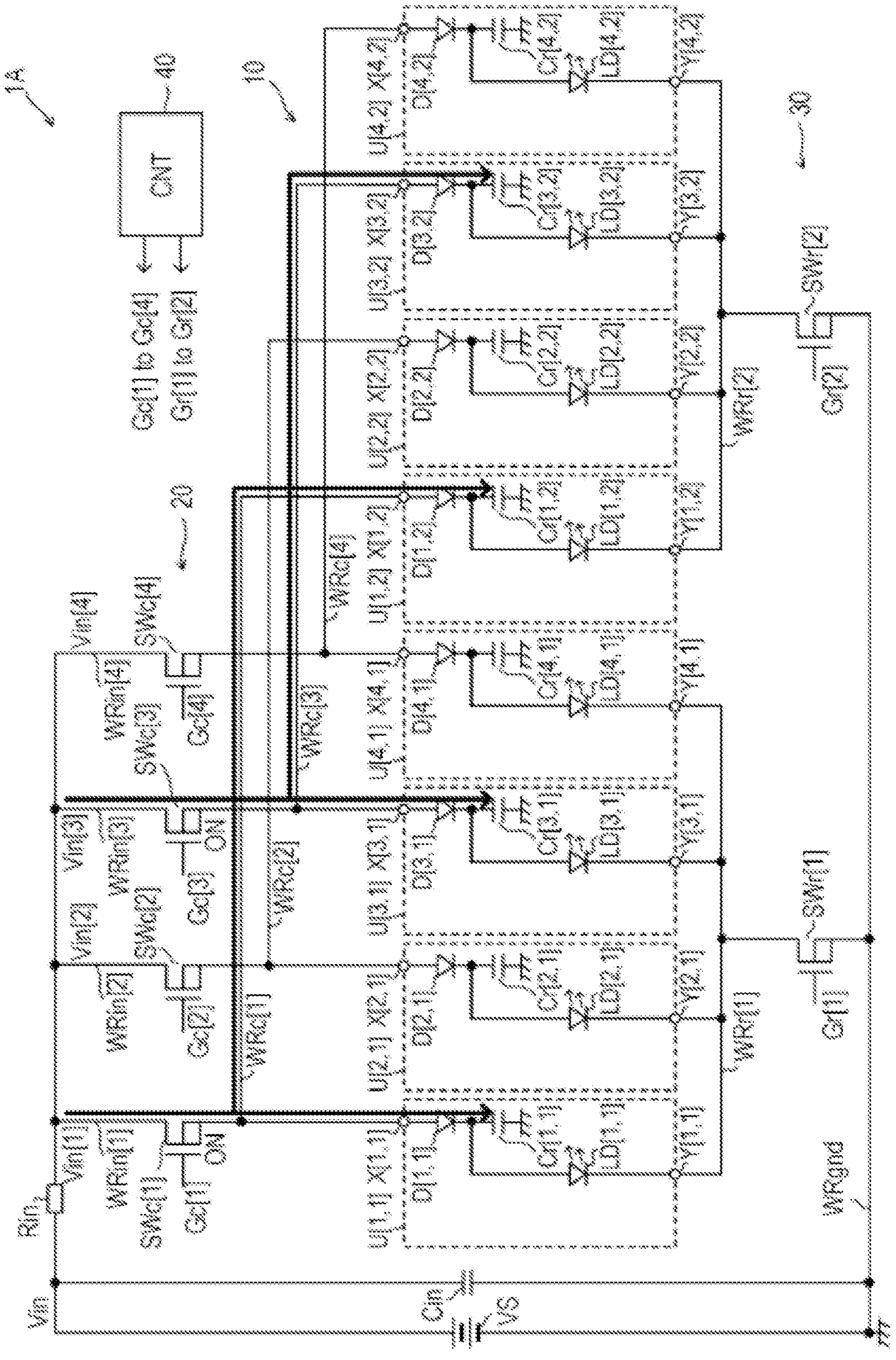
FIG. 17 is a diagram showing a flow of a charging current during an on period of two charging switches, according to an eighth Example belonging to the embodiment of the present disclosure.

FIG. 17 shows a flow of a charging current when the charging switches SWc[1] and SWc[3] are turned on simultaneously in the mixed unit operation. During the on periods of the charging switches SWc[1] and SWc[3] in the mixed unit operation, the capacitors Cr[1,1], Cr[1,2], Cr[3,1], and Cr[3,2] are charged simultaneously.

In the mixed unit operation, during the on period of the light emitting switch SWr[1], the light emitting elements LD[1,1] and LD[3,1] simultaneously emit light based on the accumulated charges of the capacitors Cr[1,1] and Cr[3,1], and during the on period of the light emitting switch SWr[2], the light emitting elements LD[1,2] and LD[3,2] simultaneously emit light based on the accumulated charges of the capacitors Cr[1,2] and Cr[3,2]. High light emission intensity can be obtained by simultaneous light emission of a plurality of light emitting elements LD.

Although FIG. 17 shows the mixed unit operation in the light emitting device 1A as an example, the light emission control of the eighth Example can be applied to any of the light emitting devices 1A to 1E, and can be widely applied to the light emitting device 1 of FIG. 1. In the light emitting device 1 of FIG. 1, an arbitrary number of charging switches SWc of 2 or more and M or less may be turned on simultaneously.

Further, in the light emitting device 1, an arbitrary number of light emitting switches SWr of 2 or more and N or less may be turned on simultaneously.

Ninth Example

A ninth Example will be described. The charging diodes D may be omitted in some of the light emitting unit circuits U provided in the light emitting device 1. By omitting some charging diodes D, the number of parts and costs can be reduced. Hereinafter, for the sake of convenience, a light emitting unit circuit U including a charging diode D is referred to as a first type of light emitting unit circuit U, and a light emitting unit circuit U not including a charging diode D is referred to as a second type of light emitting unit circuit U.

Figure 18:
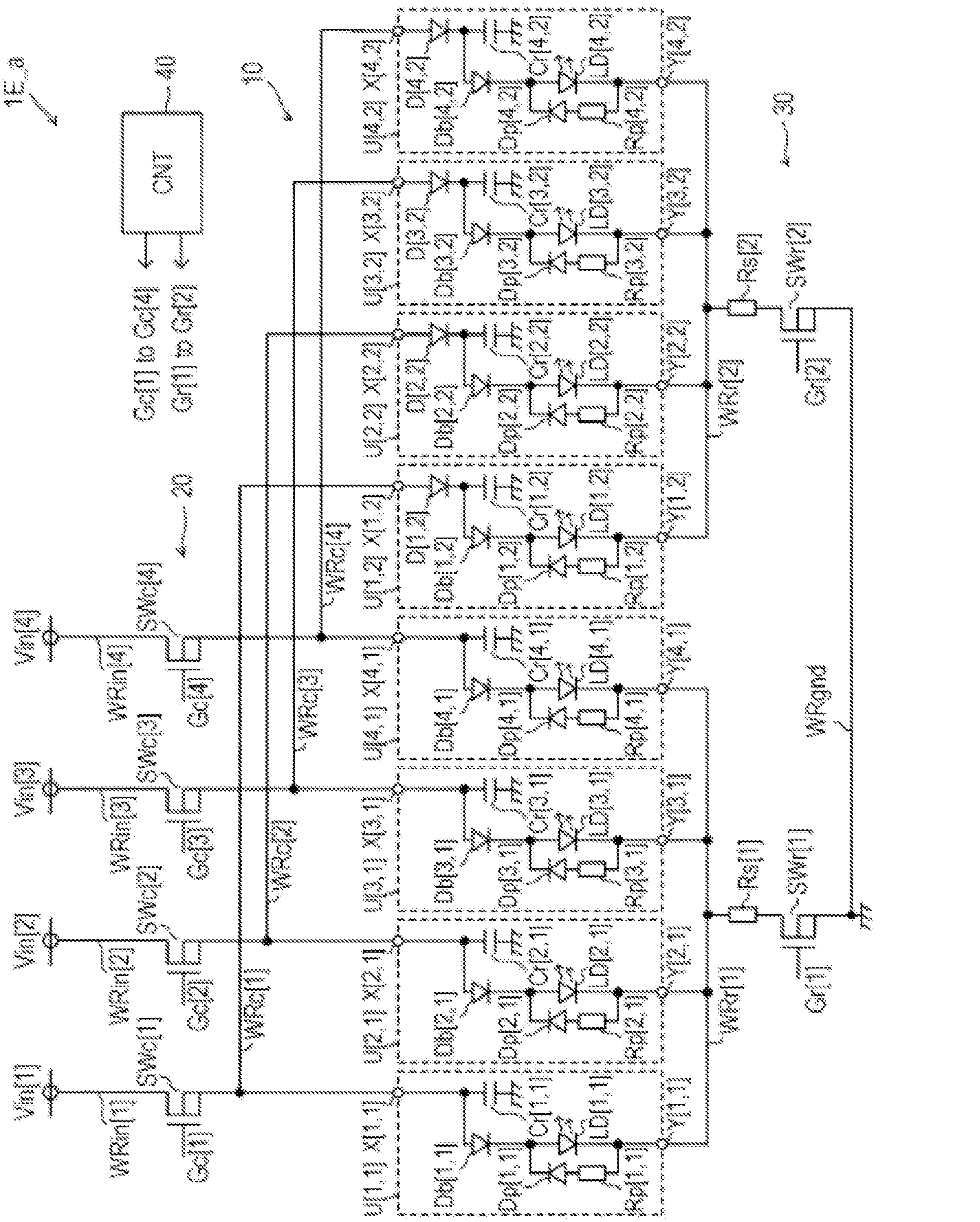
FIG. 18 is a configuration diagram of a light emitting device according to a ninth Example belonging to the embodiment of the present disclosure.

FIG. 18 shows a light emitting device 1E_a as an example of the light emitting device 1 including a first type of light emitting unit circuit U and a second type of light emitting unit circuit U. The light emitting device 1E_a includes a configuration in which the charging diodes D[1,1], D[2,1], D[3,1], and D[4,1] are deleted from the light emitting device 1E (see FIG. 14) according to the fifth Example, and includes the same configuration as the light emitting device 1E except for the deletion. With this deletion, for each integer i satisfying "1≤i≤4," the first end of the capacitor Cr[i,1] is directly connected to the input node X[i, 1] (therefore, directly connected to the charging wiring WRc [i]). Note that a modification in which the charging diodes D[1,1], D[2,1], D[3,1], and D[4,1] are deleted can be applied to any of the light emitting devices 1A to 1D.

In the light emitting device 1E_a, the light emitting unit circuits U[1,2] to U[4,2] are the first type of light emitting unit circuit U, and the light emitting unit circuits U[1,1] to U[4, 1] are the second type of light emitting unit circuit U. Executing the above-described basic light emission control (see FIGS. 4 and 8) in the light emitting device 1E_a is considered. In the first unit operation in the basic light emission control, when the charging switch SWc[1] is turned on for a predetermined time tc_on and then the light emitting switch SWr[1] is turned on (see FIGS. 5 and 6), in the light emitting device 1E_a, the presence of the charging diode D[1,2] prevents the capacitor Cr[1,2] from being discharged. Thereafter, when the light emitting switch SWr [2] is turned on, the capacitor Cr[1,2] is discharged in the same way as shown in FIG. 7. In other words, even without the charging diode D[1,1], the light emitting device 1E_a can perform the first unit operation equivalent to a case where the charging diode D[1,1] is installed. The same applies to the second to fourth unit operations.

Tenth Example

Figure 19:
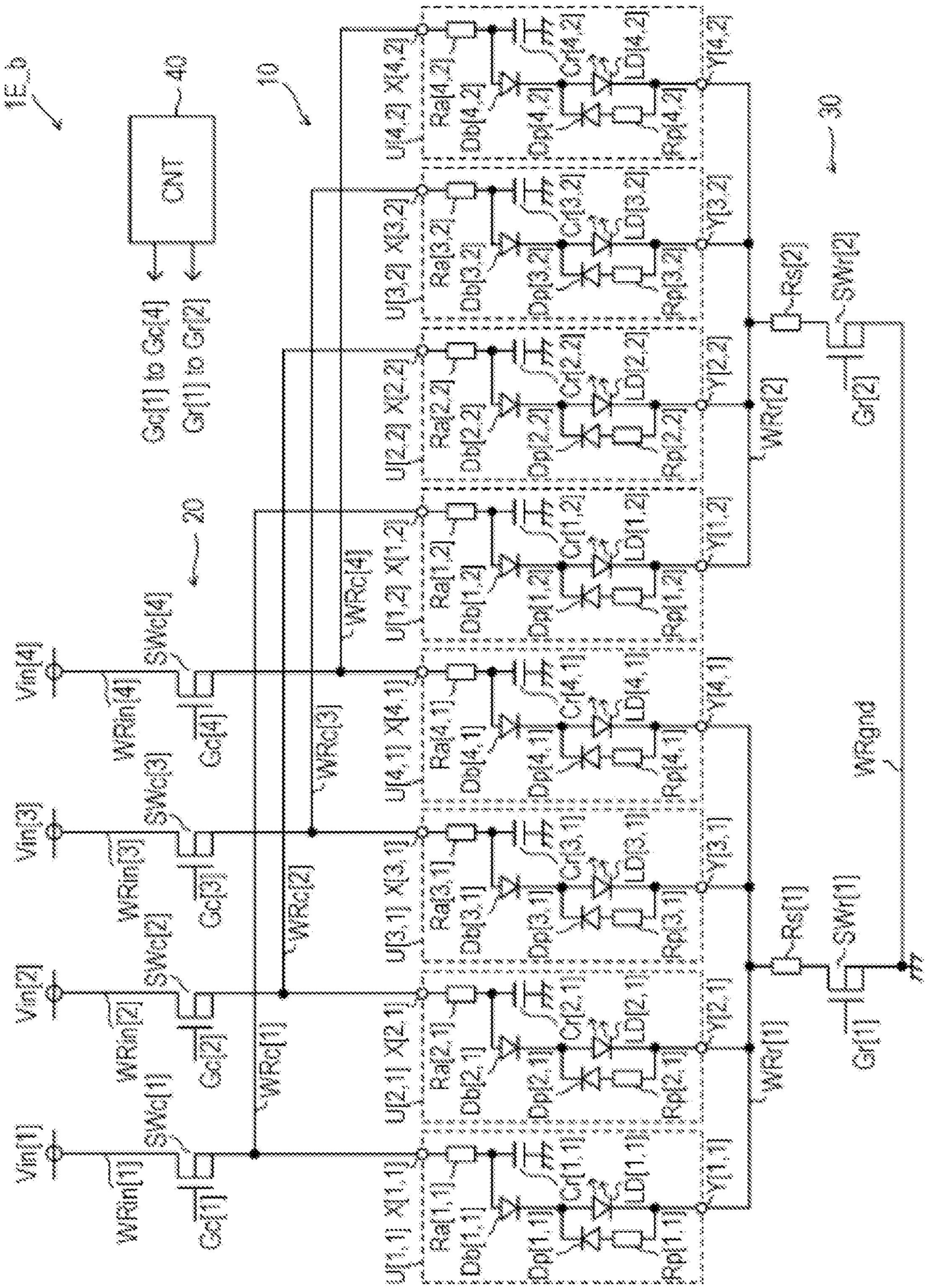
FIG. 19 is a configuration diagram of a light emitting device according to a tenth Example belonging to the embodiment of the present disclosure.

A tenth Example will be described. Any above-described light emitting device 1 may be modified to replace each charging diode D with a resistor. FIG. 19 shows a light emitting device 1E_b as an example of the modified light emitting device 1.

The light emitting device 1E_b includes a configuration in which each charging diode D is replaced with a series resistor Ra on the basis of the light emitting device 1E (see FIG. 14) according to the fifth Example. Except for this replacement, the light emitting device 1E_b includes the same configuration as the light emitting device 1E. In the light emitting device 1E_b, the series resistance Ra in the light emitting unit circuit U[i,j] is referred to as a series resistance Ra[i,j]. In the light emitting device 1E_b, the series resistor Ra[i,j] is connected in series to the capacitor Cr[i,j] in the light emitting unit circuit U[i,j], and the series resistor Ra[i,j] is interposed between the first end of the capacitor Cr[i,j] and the input node X[i,j] (therefore, between the first end of the capacitor Cr[i,j] and the charging wiring WRc[i]). Therefore, in the light emitting device 1E_b, a charging current from the charging switching circuit 20 to the capacitor Cr[i,j] is supplied to the capacitor Cr[i,j] through the series resistor Ra[i,j]. Note that a modification in which a charging diode D is replaced with a series resistor Ra can be applied to any of the light emitting devices 1A to 1D.

Executing the above-described basic light emission control (see FIGS. 4 and 8) in the light emitting device 1E_b is considered. In the first unit operation in the basic light emission control, after the charging switch SWc[1] is turned on for a predetermined time tc_on, when the light emitting switch SWr[1] is turned on (see FIGS. 5 and 6), in the light emitting device 1E_b, not only the capacitor Cr[1,1] but also the capacitor Cr[1,2] is discharged toward the light emitting element LD[1,1]. However, due to the presence of the series resistors Ra[1,2] and Ra[1,1], the amount of discharged charges of the capacitor Cr[1,2] is reduced, and even after the light emitting switch SWr[1] is turned off in the first unit operation, the capacitor Cr[1,2] remains charged to some extent. Thereafter, when the light emitting switch SWr[2] is turned on, the capacitor Cr[1,2] is discharged in the same way as shown in FIG. 7. However, the amount of discharged charges of the capacitor Cr[1,2] decreases by the amount that the capacitor Cr[1,2] is discharged during the on period of the light emitting switch SWr[1], and as a result, the light emission intensity of the light emitting element LD[1,2] is smaller than that of the light emitting element LD[1,1].

Therefore, the method according to the tenth Example is suitable when it is desired to make the light emission intensity of the light emitting element LD[1,2] smaller than that of the light emitting element LD[1,1]. By adjusting the value of each series resistor Ra, the difference in light emission intensity between the light emitting elements LD[1,1] and LD[1,2] can be adjusted as desired. The same applies to a combination of the light emitting elements LD[2,1] and LD[2,2], etc.

Eleventh Example

Figure 20:
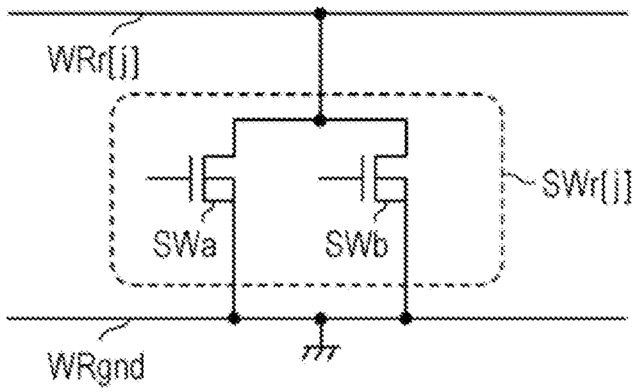
FIG. 20 is a configuration diagram of one light emitting switch according to an eleventh Example belonging to the embodiment of the present disclosure.

An eleventh Example will be described. Each light emitting switch SWr may be configured by a parallel circuit of a plurality of switching elements. FIG. 20 shows an example in which one light emitting switch SWr[j] is configured by a parallel circuit of two switching elements SWa and SWb. The following description of the light emitting switch SWr [j] applies to each integer j satisfying "1≤j≤N."

The switching elements SWa and SWb are N-channel MOSFETs. In the light emitting switch SWr[j], each of the drains of the switching elements SWa and SWb is connected to the light emitting wiring WRr[j], and each of the sources of the switching elements SWa and SWb is connected to the ground wiring WRgnd. Although not shown in FIG. 20, a shunt resistor Rs[j] may be interposed between each of the drains of the switching elements SWa and SWb and the light emitting wiring WRr[j]. The control circuit 40 individually controls the switching elements SWa and SWb to turn on or off by supplying a high level or low level gate signal to each of the gates of the switching elements SWa and SWb.

When the light emitting switch SWr[j] is configured by a parallel circuit of switching elements SWa and SWb, the on state of the light emitting switch SWr[j] may be a state in which both of the switching elements SWa and SWb of the light emitting switch SWr[j] are turned on, or may be a state in which only one of them is turned on.

Figure 21:
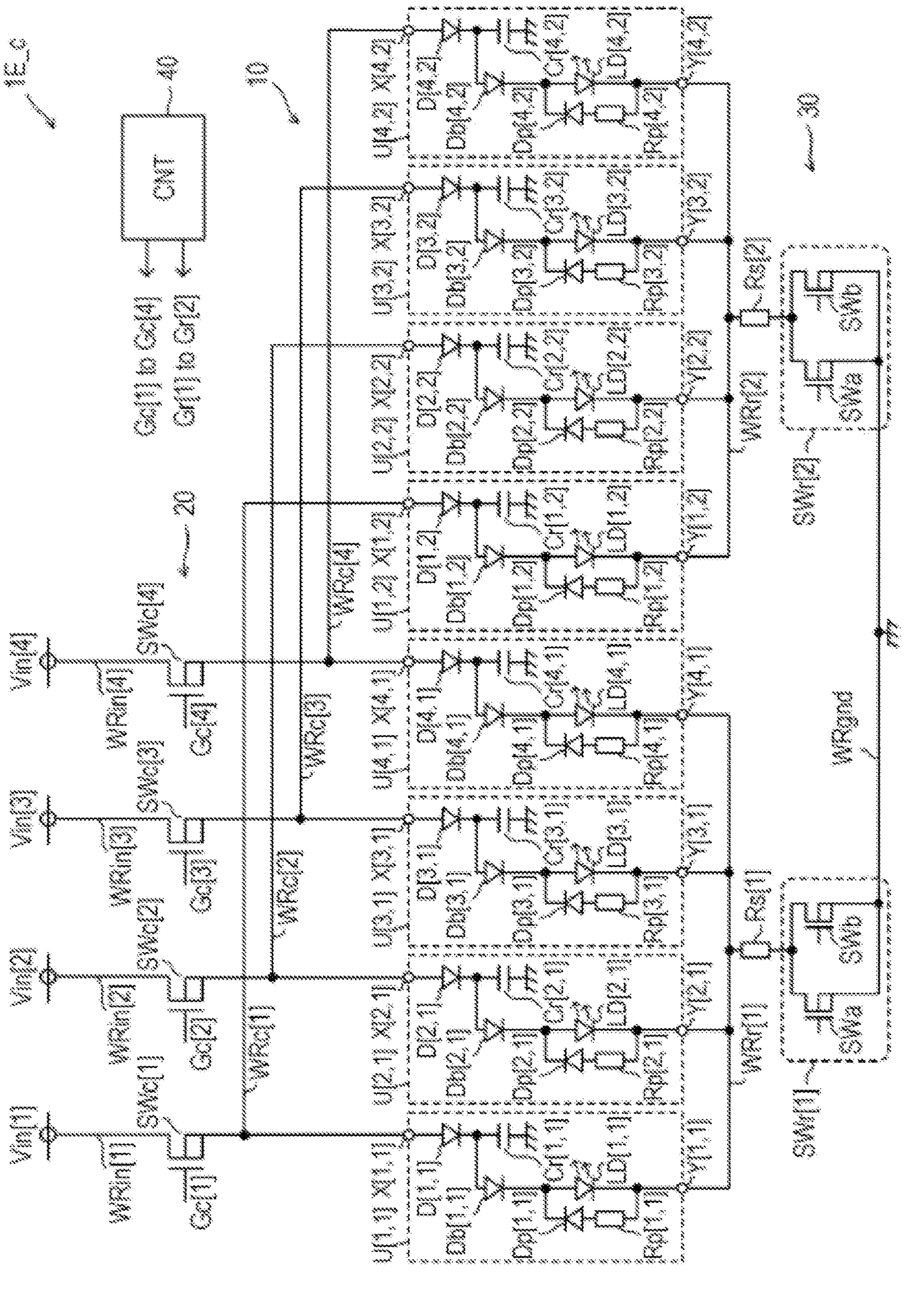
FIG. 21 is a configuration diagram of a light emitting device according to the eleventh Example belonging to the embodiment of the present disclosure.

FIG. 21 shows a light emitting device 1E_c according to the eleventh Example. The light emitting device 1E_c is obtained by applying a modification in which each light emitting switch SW is configured by the switching elements SWa and SWb, to the light emitting device 1E of FIG. 14. Similar modifications may be applied to any of the light emitting devices 1A to 1D. The following light emission control can be performed in the light emitting device 1E_c.

That is, for example, the control circuit 40 turns on only the switching element SWa of the light emitting switch SWr[1] when controlling the light emitting switch SWr[1] to be turned on in the first and third unit operations, and turns on only the switching element SWb of the light emitting switch SWr[1] when controlling the light emitting switch SWr[1] to be turned on in the second and fourth unit operations. This allows a current flowing through the light emitting elements LD[1,1] and LD[3,1] to pass through the switching element SWa of the light emitting switch SWr[1] and a current flowing through the light emitting elements LD[2,1] and LD[4,1] to pass through the switching element SWb of the light emitting switch SWr[1]. As a result, heat generated by the light emitting switch SWr[1] can be dispersed by the switching elements SWa and SWb.

Further, when the light emitting switch SWr[1] is configured by a single switching element, there is a possibility that the wiring length between the light emitting elements LD[1, 1] to LD[4,1] and the single switching element becomes relatively long. An increase in wiring length causes an increase in inductance component. Configuring the light emitting switch SWr[1] by a plurality of switching elements leads to a reduction in wiring length. This is because it is possible to arrange the switching element SWa of the light emitting switch SWr[1] near the output nodes Y[1,1] and Y[3,1] and arrange the switching element SWb of the light emitting switch SWr[1] near the output nodes Y[2,1] and Y[4,1].

The same applies to the light emitting switch SWr[2]. That is, the control circuit 40 can turn on only the switching element SWa of the light emitting switch SWr[2] when controlling the light emitting switch SWr[2] to be turned on in the first and third unit operations, and turn on only the switching element SWb of the light emitting switch SWr[2] when controlling the light emitting switch SWr[2] to be turned on in the second and fourth unit operations.

Although a specific operation example has been described in which the light emitting switch SWr[j] is configured by the parallel circuit of two switching elements SWa and SWb, the light emitting switch SWr[j] may be configured by a parallel circuit of three or more switching elements.

Twelfth Example

A twelfth Example will be described. In each of the above-described Examples, it is basically assumed that the voltage between both terminals of the capacitors Cr[i, 1] to Cr[i,N] increases up to the input voltage Vin[i] during the on period of the charging switch SWc[i] (ignoring the forward voltage of the charging diode D). Under this assumption, by adopting the configuration of the light emitting device 1E (FIGS. 14 and 15), it is possible to vary the light emission intensity between the plurality of light emitting elements LD by varying the input voltages Vin[1] to Vin[M].

However, in the light emitting device 1 (for example, any of the light emitting devices 1A to 1D) in which the input voltages Vin[1] to Vin[M] are common, by adopting the following modified charging method, the light emission intensity between the plurality of light emitting elements LD may be made different. The modified charging method will be described using the light emitting devices 1A to 1D as examples (see, e.g., FIG. 3).

The on-time of the charging switch SWc[i] in the i-th unit period is represented by symbol "tc_on[i]." The on-time tc_on[i] represents the time (length of time) during which the charging switch SWc[i] is kept in the on state in the i-th unit period. In the above-described first Example and the like, it is assumed that the common predetermined time tc_on is set to the on-times tc_on[1] to tc_on[4], but the control circuit 40 according to the modified charging method can individually set the on-times tc_on[1] to tc_on[4] and can make two or more of the on-times tc_on[1] to tc_on[4] to be different from each other.

For example, in the light emitting devices 1A to 1D, the control circuit 40 according to the modified charging method sets the on-time tc_on[1] to be sufficiently long so that a voltage between both terminals of the capacitors Cr[1,1] and Cr[1,2] increases up to the input voltage Vin during the on period of the charging switch SWc[1]. In contrast, in the light emitting devices 1A to 1D, the control circuit 40 according to the modified charging method sets the on-time tc_on[2] to be shorter than the on-time tc_on[1] so that a voltage between both terminals of the capacitors Cr[2,1] and Cr[2,2] increases only up to a voltage Vin/2 during the on period of the charging switch SWc[2]. Then, when each light emitting element LD emits light, the light emission intensities of the light emitting elements LD[2,1] and Cr[2,2] can be lower than the light emission intensities of the light emitting elements LD[1,1] and LD[1,2]. That is, the same effects as when "Vin[1]>Vin[2]" is set in the light emitting device 1E can be obtained.

Thirteenth Example

A thirteenth embodiment will be described.

The light emitting element LD may be any type of light emitting element that emits light when supplied with a current. Therefore, for example, the light emitting element LD may be a light emitting diode (LED) or an organic LED realizing organic electroluminescence.

Regarding any signal or voltage, the relationship between high level and low level can be reversed as described above, without detracting from the spirit of the above.

The types of channels of FETs (Field Effect Transistors) shown in each embodiment are merely examples. The type of channel of any FET may be varied between P-channel and N-channel, without detracting from the spirit of the above.

Any of the transistors described above may be any type of transistor as long as it does not cause any inconvenience. For example, any transistor described above as a MOSFET may be replaced with a junction FET, an IGBT (Insulated Gate Bipolar Transistor), or a bipolar transistor as long as it does not cause any inconvenience. Any transistor includes a first electrode, a second electrode, and a control electrode. In the FET, one of the first and second electrodes is the drain, the other is the source, and the control electrode is the gate. In the IGBT, one of the first and second electrodes is the collector, the other is the emitter, and the control electrode is the gate. In the bipolar transistor not belonging to the IGBT, one of the first and second electrodes is the collector, the other is the emitter, and the control electrode is the base.

Further, since there is little need for high-speed operation of the charging switch SWc, a relay switch (electromagnetic relay) may be used as the charging switch SWc instead of a semiconductor switching element.

The embodiments of the present disclosure can be appropriately modified in various ways within the scope of the technical ideas shown in the claims. The above-described embodiments are merely examples of the embodiments of the present disclosure, and the meanings of the terms of the present disclosure or configuration requirements are not limited to those described in the above-described embodiments. The specific numerical values shown in the above description are merely examples, and it goes without saying that they can be changed to various numerical values.

<<Supplementary Notes>>

Supplementary notes will be provided for the present disclosure in which specific configuration examples are shown in the above-described embodiments.

A light emitting device (1; see FIGS. 1 and 2, etc.) according to one aspect of the present disclosure has a configuration (first configuration) that includes: first to L-th light emitting unit circuits (L light emitting unit circuits U), each of which includes a light emitting element (LD) configured to emit light by being supplied with a current, and a capacitor (Cr) configured to accumulate charges for supply to the light emitting element; a charging switching circuit (20) including first to M-th charging switches (SWc[1] to SWc[M]) and configured to switch between supply and non-supply of a charging current to each capacitor; a light emitting switching circuit (30) including first to N-th light emitting switches (SWr[1] to SWr[N]) and configured to switch between supply and non-supply of the accumulated charges of the capacitor to the light emitting element in each of the light emitting unit circuits; and a control circuit (40) configured to control a state of each of the charging switches and a state of each of the light emitting switches, wherein each of the charging switches is associated with two or more light emitting unit circuits among the first to L-th light emitting unit circuits, and for each combination of two charging switches in the first to M-th charging switches, the two or more light emitting unit circuits associated with one charging switch and the two or more light emitting unit circuits associated with the other charging switch are different from each other, wherein each of the first to M-th charging switches switches between supply and non-supply of the charging current to each capacitor in the two or more light emitting unit circuits associated with the each of the first to M-th charging switches, wherein each of the light emitting switches is associated with a plurality of light emitting unit circuits among the first to L-th light emitting unit circuits, and for each combination of two light emitting switches in the first to N-th light emitting switches, the plurality of light emitting unit circuits associated with one light emitting switch and the plurality of light emitting unit circuits associated with the other light emitting switch are different from each other, wherein each of the first to N-th light emitting switches switches between supply and non-supply of the accumulated charges of the capacitor to the light emitting element for the plurality of light emitting unit circuits associated with the each of the first to N-th light emitting switches, and wherein L represents an integer of 4 or more, and M and N represent integers of 2 or more.

As a result, it is possible to reduce the circuit size as compared to the configuration shown in FIG. 9.

The light emitting device (see, e.g., the second Example and FIG. 11) of the first configuration may include a configuration (second configuration) that in each of the light emitting unit circuits, the capacitor includes a first end and a second end, in each of the light emitting unit circuits, when the charging current is supplied to the capacitor through the charging switching circuit, a potential at the first end of the capacitor increases when seen from a potential at the second end of the capacitor, in each of the light emitting unit circuits, the light emitting element includes a first end and a second end, and the light emitting element emits light by a current flowing from the first end of the light emitting element to the second end of the light emitting element, in each of the light emitting unit circuits, a parallel circuit including a protection diode (Dp) is connected in parallel to the light emitting element, and a forward direction of the protection diode is a direction from the second end of the light emitting element toward the first end of the light emitting element, and in each of the light emitting unit circuits, a backflow blocking diode (Db) is interposed between the first end of the capacitor and the first end of the light emitting element, and a forward direction of the backflow blocking diode is a direction from the first end of the capacitor toward the first end of the light emitting element.

By installing the protection diode, the application of an excessive reverse bias voltage to the light emitting element is suppressed. By installing the backflow blocking diode, the flow of charges into the capacitor through the protection diode is suppressed.

The light emitting device (see, e.g., the third Example and FIG. 12) of the second configuration may include a configuration (third configuration) that in each of the light emitting unit circuits, the parallel circuit includes a resistor (Rp) connected in series to the protection diode.

As a result, it is possible to further suppress the charges from flowing into the capacitor through the protection diode.

The light emitting device of the second or third configuration may include a configuration (fourth configuration) that each of the light emitting unit circuits includes a charging diode (D), wherein in each of the light emitting unit circuits, the charging diode is connected in series to the capacitor, and the charging diode has a forward direction from the charging switching circuit toward the capacitor, and the charging current from the charging switching circuit to the capacitor is supplied to the capacitor through the charging diode.

The light emitting device (see the ninth Example and FIG. 18) of the second or third configuration may include a configuration (fifth configuration) that each of the light emitting unit circuits is a first type of light emitting unit circuit or a second type of light emitting unit circuit, wherein the first to L-th light emitting unit circuits each include two or more first type of light emitting unit circuits and two or more second type of light emitting unit circuits, wherein a charging diode (D) is provided in only the first type of light emitting unit circuit of the first type of light emitting unit circuit and the second type of light emitting unit circuit, and wherein in each of the two or more first types of light emitting unit circuits, the charging diode is connected in series to the capacitor, the charging diode has a forward direction from the charging switching circuit toward the capacitor, and the charging current from the charging switching circuit to the capacitor is supplied to the capacitor through the charging diode.

The light emitting device (see the tenth Example and FIG. 19) of the second or third configuration may include a configuration (sixth configuration) that each of the light emitting unit circuits includes a series resistor (Ra), wherein in each of the light emitting unit circuits, the series resistor is connected in series to the capacitor, and the charging current from the charging switching circuit to the capacitor is supplied to the capacitor through the series resistor.

The light emitting device of any one of the first to sixth configurations may include a configuration (seventh configuration) that L>M+N is satisfied.

As a result, it is possible to reduce the required number of switches as compared to the configuration shown in FIG. 9.

The light emitting device of any one of the first to seventh configurations may include a configuration (eighth configuration) that further includes: first to N-th shunt resistors (Rs[1] and Rs[2] in FIG. 13) configured to individually detect currents flowing through the first to N-th light emitting switches.

The light emitting device (see FIG. 1) of any one of the first to seventh configurations may include a configuration (ninth configuration) that each of the light emitting unit circuits belongs to any one of first to N-th light emitting groups (GRP[1] to GRP[N]), wherein each of the light emitting unit circuits belonging to a j-th light emitting group is associated with a j-th light emitting switch (SWr[j]), wherein each of the light emitting groups includes M light emitting unit circuits (U[1,j] to U[M,j]), wherein an i-th light emitting unit circuit (U[i,j]) in each of the light emitting groups is associated with an i-th charging switch, and wherein i represents a natural number of M or less, and j represents a natural number of N or less.

The light emitting device (see FIG. 1) of the ninth configuration may include a configuration (tenth configuration) that the first ends of the first to M-th charging switches are connected to first to M-th input wirings (WRin[1] to WRin[M]), respectively, wherein first to M-th input voltages (Vin[1] to Vin[M]) are applied to the first to M-th input wirings, respectively, wherein the second ends of the first to M-th charging switches are connected to first to M-th charging wirings (WRc[1] to WRc[M]), respectively, wherein the i-th light emitting unit circuit (U[i,j]) in each of the light emitting groups is connected to an i-th charging wiring (WRc[i]), wherein when the i-th charging switch is turned on, a charging operation is executed in which the charging current based on an i-th input voltage is applied to the capacitor in the i-th light emitting unit circuit in each of the light emitting groups through the i-th charging switch and the i-th charging wiring, and when the i-th charging switch is turned off, the charging operation is not executed, wherein the first ends of the first to N-th light emitting switches are connected to first to N-th light emitting wirings (WRr[1] to WRr[N]), respectively, wherein the second end of each of the first to N-th light emitting switches is connected to a reference wiring (WRgnd) having a reference potential, wherein each of the light emitting unit circuits (U[1,j] to U[M,j]) belonging to the j-th light emitting group is connected to a j-th light emitting wiring (WRr[j]), and wherein in each of the light emitting unit circuits belonging to the j-th light emitting group, when the j-th light emitting switch is turned on, a discharging current due to the accumulated charges of the capacitor flows through the corresponding light emitting element, the j-th light emitting wiring, and the j-th light emitting switch.

The light emitting device (see FIGS. 4 and 8) of the tenth configuration may include a configuration (eleventh configuration) that the control circuit executes light emission control including first to M-th unit operations, and in an i-th unit operation, turns on the i-th charging switch for a predetermined time and then turns on one or more light emitting switches.

The light emitting device (see FIGS. 4 and 8) of the eleventh configuration may include a configuration (twelfth configuration) that in the i-th unit operation, the control circuit turns on the i-th charging switch for the predetermined time and then turns on the first to N-th light emitting switches sequentially at different timings.

The light emitting device (see FIGS. 4 and 8) of the eleventh configuration may include a configuration (thirteenth configuration) that in the light emission control, the control circuit executes the first to M-th unit operations sequentially at different timings.

The light emitting device (see the eighth Example and FIG. 17) of the eleventh or twelfth configuration may include a configuration (fourteenth configuration) that in the light emission control, the control circuit turns on two or more of the first to M-th charging switches simultaneously.

The light emitting device (see, e.g., FIG. 3) of any one of the tenth to fourteenth configurations may include a configuration (fifteenth configuration) that the first to M-th input voltages are a common input voltage, and the first to M-th input wirings are the common input wiring to which a common input voltage is applied.

The light emitting device (see, e.g., FIGS. 14 and 15) of any one of the tenth to fourteenth configurations may include a configuration (sixteenth configuration) that two or more input voltages that are different from each other are included in the first to M-th input voltages.

The light emitting device (see the sixth Example and FIGS. 14 to 16) of any one of the tenth to fourteenth configurations may include a configuration (seventeenth configuration) that further includes first to N-th shunt resistors (Rs[1] and Rs[2]), wherein a j-th shunt resistor is connected in series to the j-th light emitting switch, and wherein the control circuit individually detects the currents flowing through the first to N-th light emitting switches based on a voltage drop occurring in the first to N-th shunt resistors, and variably sets any one of the first to M-th input voltages based on a detection result.

As a result, it is possible to control the light emission intensity of any light emitting element as desired, or to equalize the light emission intensity among any plurality of light emitting elements.

The light emitting device (see the seventh Example) of any one of the tenth to fourteenth configurations may include a configuration (eighteenth configuration) that two or more input voltages which are different from each other are included in the first to M-th input voltages, wherein when a p-th input voltage is higher than a q-th input voltage, the control circuit sets on-duty of a p-th charging switch to be lower than on-duty of a q-th charging switch, and wherein p and q represent different natural numbers of M or less.

As a result, it is possible to reduce a difference in the amount of heat generated between a plurality of light emitting elements corresponding to the p-th charging switch and the q-th charging switch.

While certain embodiments have been described, these embodiments have been presented by way of example only, and are not intended to limit the scope of the disclosures.

Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light emitting device comprising:

first to L-th light emitting unit circuits, each of which includes a light emitting element configured to emit light by being supplied with a current, and a capacitor configured to accumulate charges for supply to the light emitting element;

a charging switching circuit including first to M-th charging switches and configured to switch between supply and non-supply of a charging current to each capacitor;

a light emitting switching circuit including first to N-th light emitting switches and configured to switch between supply and non-supply of the accumulated charges of the capacitor to the light emitting element in each of the light emitting unit circuits; and a control circuit configured to control a state of each of the charging switches and a state of each of the light emitting switches, wherein each of the charging switches is associated with two or more light emitting unit circuits among the first to L-th light emitting unit circuits, and for each combination of two charging switches in the first to M-th charging switches, the two or more light emitting unit circuits associated with one charging switch and the two or more light emitting unit circuits associated with the other charging switch are different from each other, wherein each of the first to M-th charging switches switches between supply and non-supply of the charging current to each capacitor in the two or more light emitting unit circuits associated with the each of the first to M-th charging switches, wherein each of the light emitting switches is associated with a plurality of light emitting unit circuits among the first to L-th light emitting unit circuits, and for each combination of two light emitting switches in the first to N-th light emitting switches, the plurality of light emitting unit circuits associated with one light emitting switch and the plurality of light emitting unit circuits associated with the other light emitting switch are different from each other, wherein each of the first to N-th light emitting switches switches between supply and non-supply of the accumulated charges of the capacitor to the light emitting element for the plurality of light emitting unit circuits associated with the each of the first to N-th light emitting switches, and wherein L represents an integer of 4 or more, and M and N represent integers of 2 or more.

2. The light emitting device of claim 1, wherein in each of the light emitting unit circuits, the capacitor includes a first end and a second end, wherein in each of the light emitting unit circuits, when the charging current is supplied to the capacitor through the charging switching circuit, a potential at the first end of the capacitor increases when seen from a potential at the second end of the capacitor, wherein in each of the light emitting unit circuits, the light emitting element includes a first end and a second end, and the light emitting element emits light by a current flowing from the first end of the light emitting element to the second end of the light emitting element, wherein in each of the light emitting unit circuits, a parallel circuit including a protection diode is connected in parallel to the light emitting element, and a forward direction of the protection diode is a direction from the second end of the light emitting element toward the first end of the light emitting element, and wherein in each of the light emitting unit circuits, a backflow blocking diode is interposed between the first end of the capacitor and the first end of the light emitting element, and a forward direction of the backflow blocking diode is a direction from the first end of the capacitor toward the first end of the light emitting element.

3. The light emitting device of claim 2, wherein in each of the light emitting unit circuits, the parallel circuit includes a resistor connected in series to the protection diode.

4. The light emitting device of claim 2, wherein each of the light emitting unit circuits includes a charging diode, and wherein in each of the light emitting unit circuits, the charging diode is connected in series to the capacitor, the charging diode has a forward direction from the charging switching circuit toward the capacitor, and the charging current from the charging switching circuit to the capacitor is supplied to the capacitor through the charging diode.

5. The light emitting device of claim 2, wherein each of the light emitting unit circuits is a first type of light emitting unit circuit or a second type of light emitting unit circuit, wherein the first to L-th light emitting unit circuits each include two or more first type of light emitting unit circuits and two or more second type of light emitting unit circuits, wherein a charging diode is provided in only the first type of light emitting unit circuit of the first type of light emitting unit circuit and the second type of light emitting unit circuit, and wherein in each of the two or more first type of light emitting unit circuits, the charging diode is connected in series to the capacitor, the charging diode has a forward direction from the charging switching circuit toward the capacitor, and the charging current from the charging switching circuit to the capacitor is supplied to the capacitor through the charging diode.

6. The light emitting device of claim 2, wherein each of the light emitting unit circuits includes a series resistor, and wherein in each of the light emitting unit circuits, the series resistor is connected in series to the capacitor, and the charging current from the charging switching circuit to the capacitor is supplied to the capacitor through the series resistor.

7. The light emitting device of claim 1, wherein L>M+N is satisfied.

8. The light emitting device of claim 1, further comprising: first to N-th shunt resistors configured to individually detect currents flowing through the first to N-th light emitting switches.

9. The light emitting device of claim 1, wherein each of the light emitting unit circuits belongs to any one of first to N-th light emitting groups, wherein each of the light emitting unit circuits belonging to a j-th light emitting group is associated with a j-th light emitting switch, wherein each of the light emitting groups includes M light emitting unit circuits, wherein an i-th light emitting unit circuit in each of the light emitting groups is associated with an i-th charging switch, and wherein i represents a natural number of M or less, and j represents a natural number of N or less.

10. The light emitting device of claim 9, wherein first ends of the first to M-th charging switches are connected to first to M-th input wirings, respectively, wherein first to M-th input voltages are applied to the first to M-th input wirings, respectively, wherein second ends of the first to M-th charging switches are connected to first to M-th charging wirings, respectively, wherein the i-th light emitting unit circuit in each of the light emitting groups is connected to an i-th charging wiring, wherein when the i-th charging switch is turned on, a charging operation is executed in which the charging current based on an i-th input voltage is applied to the capacitor in the i-th light emitting unit circuit in each of the light emitting groups through the i-th charging switch and the i-th charging wiring, and when the i-th charging switch is turned off, the charging operation is not executed, wherein first ends of the first to N-th light emitting switches are connected to first to N-th light emitting wirings, respectively, wherein a second end of each of the first to N-th light emitting switches is connected to a reference wiring having a reference potential, wherein each of the light emitting unit circuits belonging to the j-th light emitting group is connected to a j-th light emitting wiring, and wherein in each of the light emitting unit circuits belonging to the j-th light emitting group, when the j-th light emitting switch is turned on, a discharging current due to the accumulated charges of the capacitor flows through the corresponding light emitting element, the j-th light emitting wiring, and the j-th light emitting switch.

11. The light emitting device of claim 10, wherein the control circuit executes light emission control including first to M-th unit operations, and in an i-th unit operation, turns on the i-th charging switch for a predetermined time and then turns on one or more light emitting switches.

12. The light emitting device of claim 11, wherein in the i-th unit operation, the control circuit turns on the i-th charging switch for the predetermined time and then turns on the first to N-th light emitting switches sequentially at different timings.

13. The light emitting device of claim 11, wherein in the light emission control, the control circuit executes the first to M-th unit operations sequentially at different timings.

14. The light emitting device of claim 11, wherein in the light emission control, the control circuit turns on two or more of the first to M-th charging switches simultaneously.

15. The light emitting device of claim 10, wherein the first to M-th input voltages are a common input voltage, and wherein the first to M-th input wirings are a common input wiring to which the common input voltage is applied.

16. The light emitting device of claim 10, wherein two or more input voltages that are different from each other are included in the first to M-th input voltages.

17. The light emitting device of claim 10, further comprising first to N-th shunt resistors, wherein a j-th shunt resistor is connected in series to the j-th light emitting switch, and wherein the control circuit individually detects currents flowing through the first to N-th light emitting switches based on a voltage drop occurring in the first to N-th shunt resistors, and variably sets any one of the first to M-th input voltages based on a detection result.

18. The light emitting device of claim 10, wherein two or more input voltages that are different from each other are included in the first to M-th input voltages, wherein when a p-th input voltage is higher than a q-th input voltage, the control circuit sets on-duty of a p-th charging switch to be lower than on-duty of a q-th charging switch, and wherein p and q represent different natural numbers of M or less.

* * * * *